US005732577A

United States Patent [19]

Okada et al.

[11] Patent Number: 5,732,577

[45] Date of Patent: Mar. 31, 1998

[54] VEHICLE WHEEL LOCK

[75] Inventors: Mitsuhiro Okada; Yasuyuki Muramatsu; Hiroshi Yamaoka, all of Iwata, Japan

[73] Assignee: Yamaha Hatsudoki Kabushiki Kaisha, Iwata, Japan

[21] Appl. No.: 287,661

[22] Filed: Aug. 9, 1994

[30] Foreign Application Priority Data

| | | | |
|---|---|---|---|
| Aug. 11, 1993 | [JP] | Japan | 5-220636 |
| Aug. 11, 1993 | [JP] | Japan | 5-220637 |
| Aug. 11, 1993 | [JP] | Japan | 5-220638 |

[51] Int. Cl.[6] .......... E05B 73/00; F16C 11/06

[52] U.S. Cl. .......... 70/18; 70/49; 70/233; 403/162; 411/399

[58] Field of Search .......... 411/399; 403/161–163; 70/14–18, 49, 50, 229, 233

[56] References Cited

U.S. PATENT DOCUMENTS

| | | | |
|---|---|---|---|
| 298,104 | 5/1884 | Mackay et al. | 403/162 |
| 384,297 | 6/1888 | Sweett | 403/162 |
| 620,999 | 3/1899 | Wambsgans | 403/162 X |
| 687,750 | 12/1901 | Held | 403/162 |
| 1,372,327 | 3/1921 | Young | 403/162 X |
| 2,952,486 | 9/1960 | Reuter et al. | 403/162 X |
| 3,277,601 | 10/1966 | Ryan | 403/163 X |
| 3,696,647 | 10/1972 | Balicki | 70/49 |
| 3,747,376 | 7/1973 | White, Jr. | 70/18 |
| 3,748,876 | 7/1973 | Mathews | 70/18 |
| 3,933,015 | 1/1976 | Balicki | 70/49 |
| 3,959,995 | 6/1976 | Fletcher | 70/18 |
| 4,760,718 | 8/1988 | Muramatsu et al. | 70/18 |
| 5,205,667 | 4/1993 | Montgomery, Sr. | 403/161 X |
| 5,475,993 | 12/1995 | Kuo | 70/49 X |
| 5,487,285 | 1/1996 | Leichel et al. | 70/49 X |

FOREIGN PATENT DOCUMENTS

| | | | |
|---|---|---|---|
| 46403 | 10/1932 | Denmark | 403/162 |
| 555482 | 3/1933 | France | 403/162 |
| 2347564 | 4/1976 | France . | |
| 2497552 | 7/1982 | France . | |
| 2619846 | 3/1989 | France . | |
| 9307702 | 7/1993 | Germany . | |

*Primary Examiner*—Suzanne Dino
*Attorney, Agent, or Firm*—Knobbe, Martens, Olson & Bear LLP

[57] ABSTRACT

A number of embodiments of wheel locks for vehicle wheels having an opening are disclosed. In each embodiment, the lock includes a plurality of pivotally connected elongated members having end members that are provided with a locking means for locking them together. As a result, the lock can be inserted through the wheel and around a fixed object and locked like a chain. Various embodiments are disclosed for protecting the pivot pins of the pivotal connections from attack and for restraining the pivotal movement of the elongated members. In some embodiments, the pivotal movement is restrained by placing a frictional drag on the components so that the elements cannot freely pivot. In other embodiments the degree of pivotal movement in one direction is limited more than in another direction so that the lock can only be installed in the correct relationship.

11 Claims, 26 Drawing Sheets

65
64
78
84
83
81
68
82
85
72
69
53
79
86
71

5
64
79
76
77
72
75
74
53
80
68
4
78
52
69
73
67
71
66
65
52

VEHICLE WHEEL LOCK

BACKGROUND OF THE INVENTION

This invention relates to a vehicle wheel lock and more particularly to an improved lock for a wheel of a vehicle which wheel has an opening in it and which improved lock resists attack for theft and also is easier to install.

A type of wheel lock for vehicles is disclosed in the patent of the same title, U.S. Pat. No. 4,760,718, issued Aug. 2, 1988 in the name of Yasuyuki Muramatsu and Shoji Nakamichi, assigned to the assignee hereof, that is extremely effective in protecting a vehicle against theft. This type of wheel lock includes a plurality of elongated members that are pivotally connected at adjacent ends and have end portions which are adapted to be locked together when passed through the wheel of the vehicle and some other member for retaining the wheel in position. This type of lock acts in part like a chain but is much more difficult to attack than a chain. However, this type of lock has certain areas which can be improved upon.

For example, in the lock of the type shown in U.S. Pat. No. 4,760,718 there is, as noted, a pivotal connection between adjacent ends of the elongated members. This pivotal connection is provided by a pivot-like member that extends between two pivotally connected members. By its very nature, a gap must extend between the two pivotally connected members and the pivot pin can be attacked through this gap. For example, it would be possible to pass a sharp edge tool such as a chisel or hacksaw through the gap and cut the pivot pin so as to permit removal of the lock.

It is, therefore, a principal object of this invention to provide an improved wheel lock of this type which resists attack.

It is a further object of this invention to provide an improved wheel lock for a vehicle having pivotally connected rigid members and wherein the pivot pin is protected against attack.

Because the elongate members and their pivotal connections are formed from a hardened material such as a case-hardened high alloy steel, they are by their nature somewhat heavy. This fact coupled with their pivotal connection makes installation somewhat difficult. That is, the user must form the opposite ends of the lock in a straight configuration so as to pass them through the opening in the wheel and around the member to which the wheel is to be affixed. Thus, it is possible that the interconnected members may pivot upon installation and make installation more difficult.

It is, therefore, a still further object of this invention to provide an improved lock of this type wherein the pivotal connection is such that there is some restriction to the movement.

It is a further object of this invention to provide an improved lock of this type that can be more easily installed.

Because of the nature of the lock at the ends of the member which forms the completed chain, the elongated members must be folded in a particular direction so that the lock can be effected. However, the type of pivotal connection shown in the aforenoted patent permits pivotal movement in both directions and thus a user may have the lock almost fully installed before he realizes that he has folded it in the wrong direction.

It is, therefore, a still further object of this invention to provide an improved lock of this type which can only be installed in the desired relationship.

It is a further object of this invention to provide an improved lock incorporating pivoted members wherein the degree of pivotal movement in one direction is restricted.

SUMMARY OF THE INVENTION

The features of this invention are adapted to be embodied in a wheel lock for a wheel having at least one opening through which the lock is passed. The lock comprises at least a pair of elongated members pivotally connected by means including a pivot pin. The pivotal connection includes adjacent end portions across which the pivot pin extends.

In accordance with a first feature of the invention, means are provided for occluding the area around the pivot pin between the end portions so that the pin is protected from attack.

In accordance with another feature of the invention, means are provided for restricting the pivotal movement of the elongated members about the pivot pin.

In accordance with one embodiment achieving the aforenoted feature, the means for restricting the pivotal movement comprises means for placing a frictional drag on the pivotal movement.

In accordance with another feature for achieving this result, the degree of pivotal movement between the members in one direction is restricted relative to the degree of pivotal movement in the opposite direction.

DETAILED DESCRIPTION OF THE PREFERRED EMBODIMENT OF THE INVENTION

Figure 1:
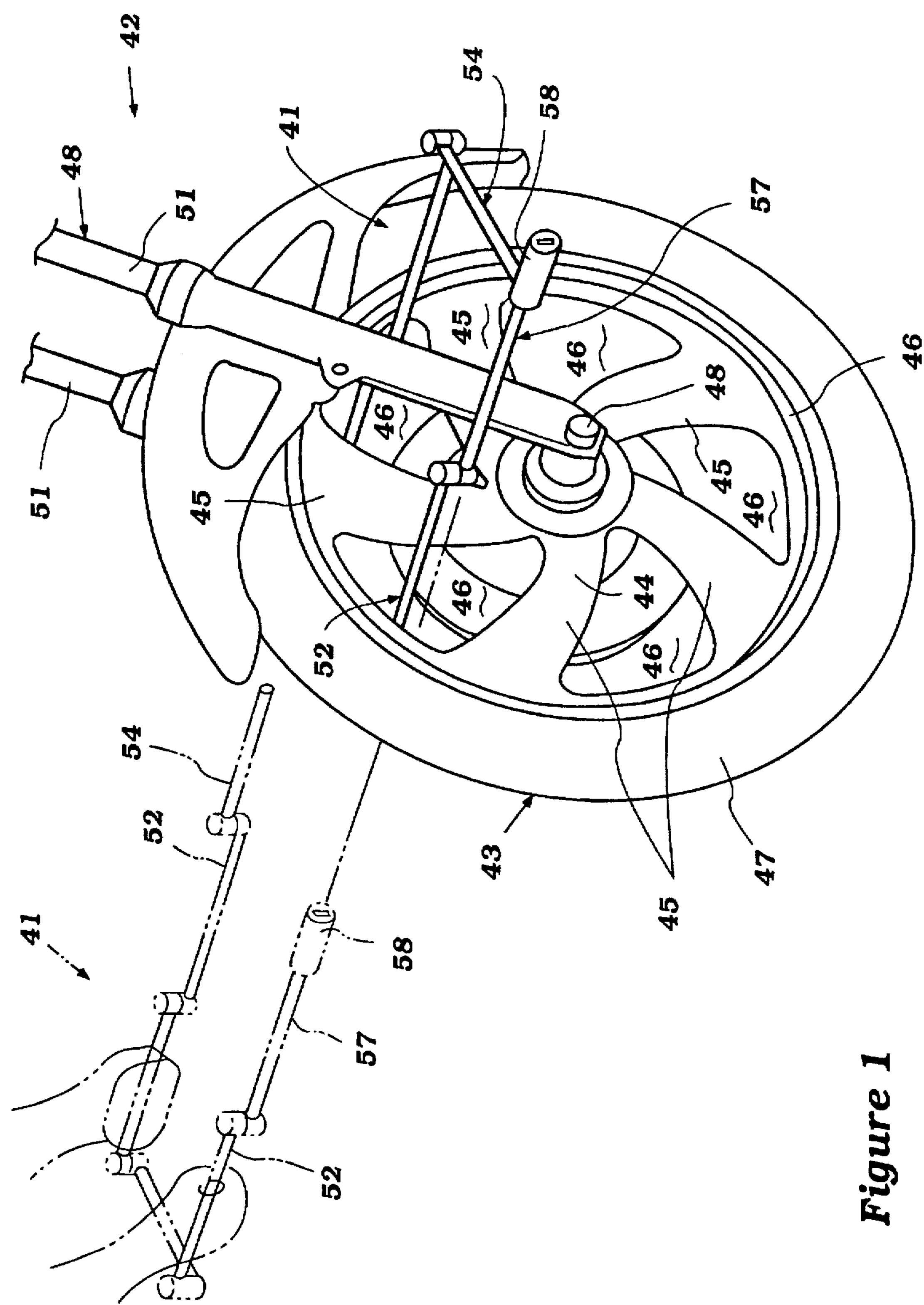
FIG. 1 is a perspective view of a portion of a vehicle incorporating a wheel lock constructed in accordance with an embodiment of the invention. The lock is shown as installed in solid line view and during installation in the phantom line view.

Referring first to the embodiment of FIGS. 1–5, a lock constructed in accordance with this embodiment is identified generally by the reference numeral 41. The lock 41 is particularly adapted for locking a vehicle, which is shown only partially and which is identified generally by the reference numeral 42. The lock 41 is primarily useable for locking a wheel such as the front wheel 43 of the vehicle 42 in a manner which will be described. The wheel 43 is comprised of a central hub portion 44 from which spokes 45 radiate. The outer periphery of the spokes 45 are connected to a rim 46 on which a tire 47 is mounted in a known manner. The area between the spokes 45 define openings 46 through at least one of which the lock 41 extends, in a manner which will be described.

The front wheel 43 and specifically its hub 44 is journaled for rotation on an axis defined by an axle 48 that is carried at the lower end of a front fork assembly, indicated generally by the reference numeral 49 and having a pair of leg portions 51 that extend on opposite sides of the front wheel 43. The front fork 49 is a further portion of the vehicle 42 which, in this illustrated embodiment may be a motorcycle or bicycle. It should be readily apparent, however, that the lock 41 may be used with a wide variety of other types of vehicles having wheels, particularly those having openings therein.

The lock assembly 41 is comprised of a plurality of rod-like links 52 that are connected to each other at adjacent ends by pivot pins 53. This is true with respect to all of the links 52 except those at the opposite ends of the lock 41. One of these end portions 54 is provided with a notched or locking end 55 that is adapted to be inserted into a lock assembly, indicated generally by the reference numeral 56 at the end of the link which forms the other end of the assembly, this link being indicated by the reference numeral 57.

Figure 2:
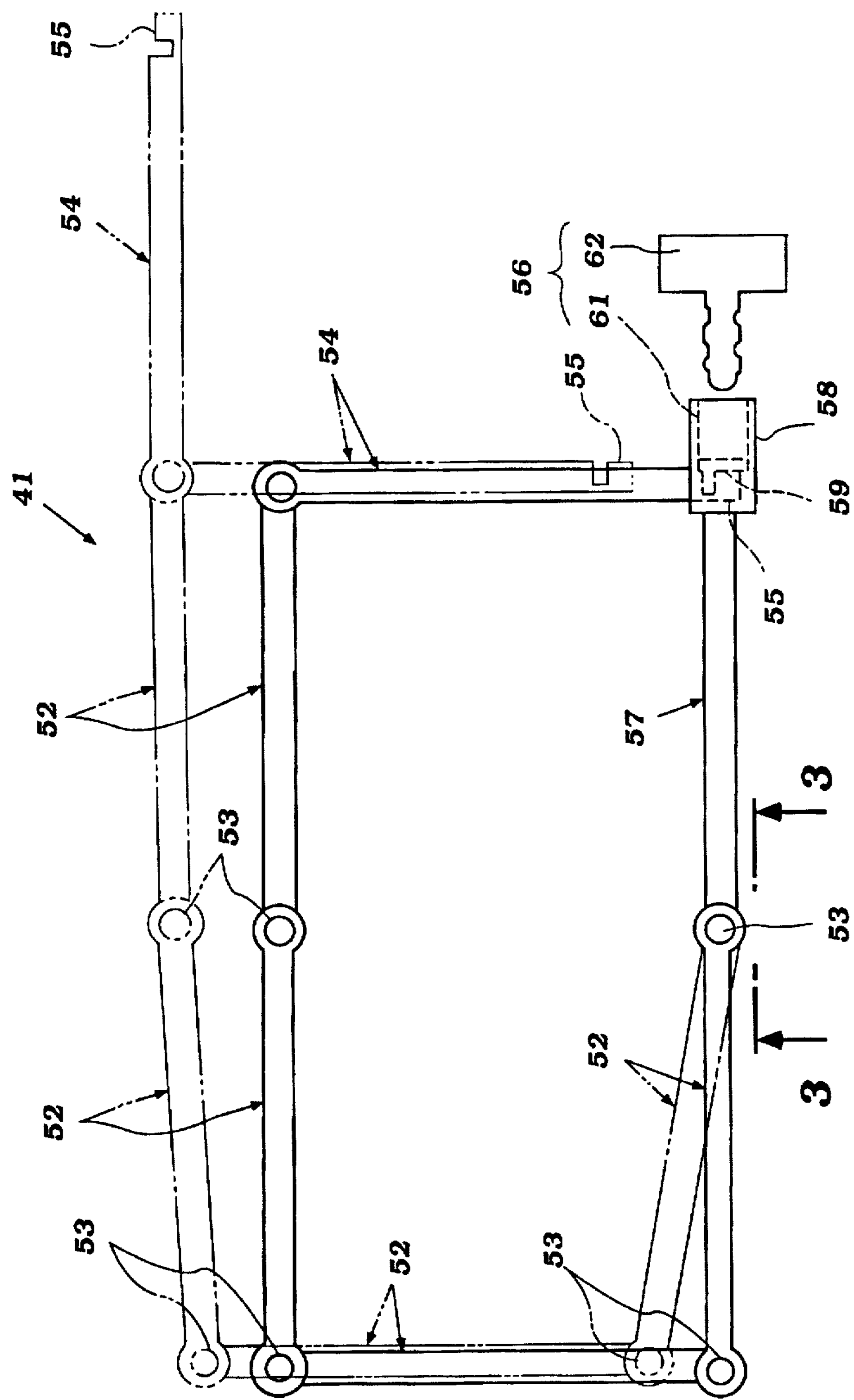
FIG. 2 is a top plan view of the lock of this embodiment, showing it in a locked condition in solid line views and in the position prior to locking in phantom line views.

Although any type of lock having an appropriate construction may be employed, the lock 56 (FIG. 2) is comprised of an assembly 58 having a rotating keeper 59 and a cylindrical portion 61. When rotated into the locking position as shown in FIG. 2, the keeper 59 engages the notch in the locking end 55 and retains the unpivoted ends of the links 54 and 57 in a locked relationship as shown in solid lines in FIG. 2.

The lock assembly 56 further includes a key 62 for turning the tumbler of the cylindrical portion 61 and releasing or engaging the lock assembly 56.

It should be noted that each of the links 52, 54 and 57 and all of the pivot pins 53 are formed from hardened materials that are very difficult to cut or break such as a chromium-molybdenum steel or the like which has its hardness further improved by case hardening or other surface treatments.

When the lock assembly 41 is unlocked, the links may be inserted through the wheel openings 46 on opposite sides of one of the spokes 45 as shown in solid lines in FIG. 1 and, around a fixed object such as the front fork 51 and/or a fixed object such as a post or the like. Then the ends 54 and 57 are locked together in the manner previously described. The installation is shown in phantom lines in FIG. 1.

Figures 3, 4:
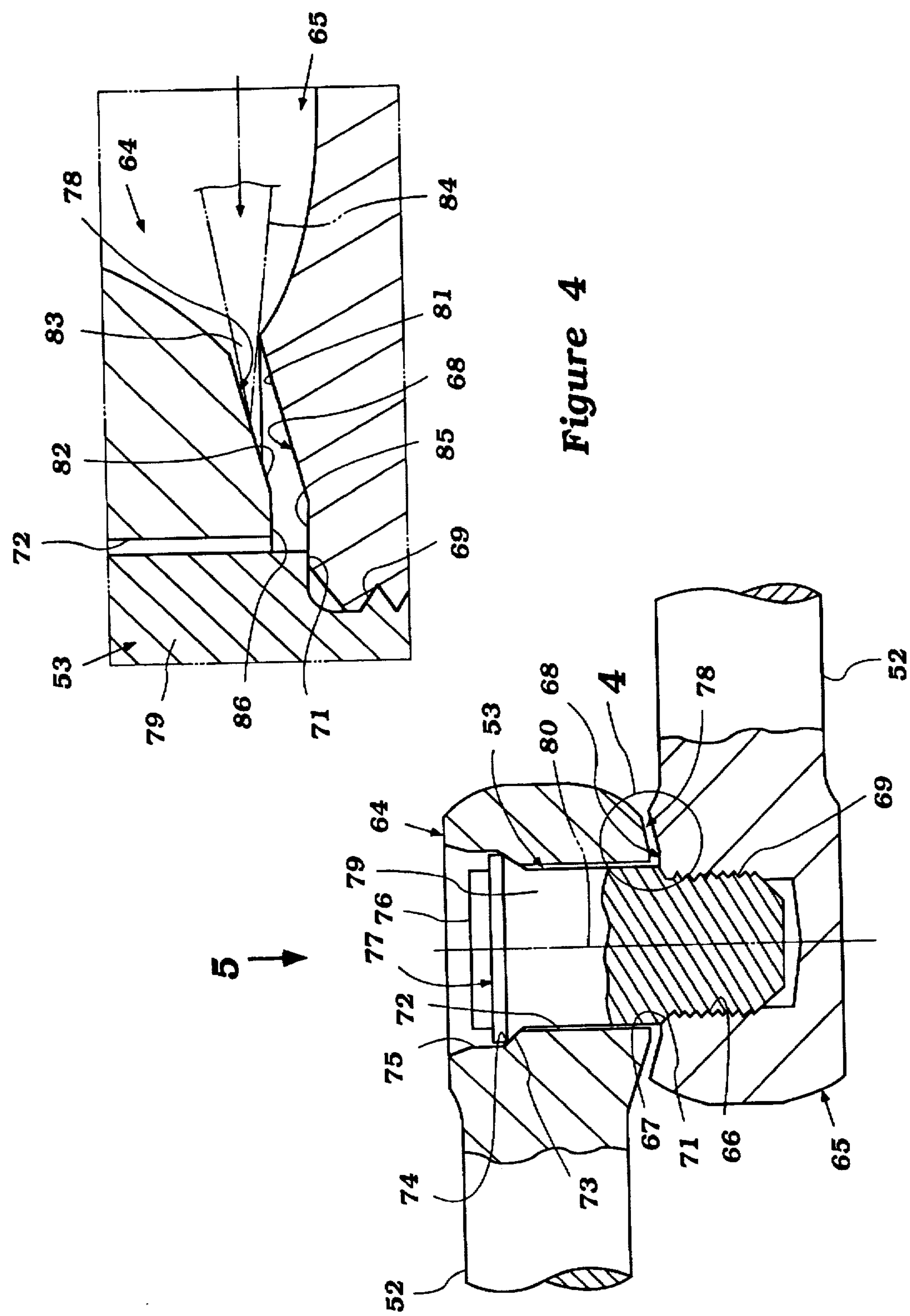
FIG. 3 is an enlarged view taken in the direction of the arrows 3—3 in FIG. 2 but showing the pivotal connection in cross section.
FIG. 4 is an enlarged view of the area encompassed by the circle 4 in FIG. 3.

The pivotal connections provided for by the pivot pins 52 with the adjacent ends of the links 52, 54 and 57 will now be described by particular reference to FIGS. 3–5. The pivotal connection is indicated generally by the reference numeral 63 and this pivotal connection is used at each pivot joint. It should be noted that the links 52, 54 and 57 all have generally cylindrical body portions with respective end portions 64 and 65 being formed at adjacent ends. The end portion 65 is comprised of a blind threaded opening 66 which terminates at a chamfered surface 67 in an upper portion 68 thereof which is configured in a particular way for a reason which will be described.

The pivot pin 53 has a threaded portion 69 that is threaded into the threads 66 and a chamfered portion 71 that is abuttingly engaged with the chamfered portion 66 of the link end 65. Hence, the pin 65 is fixed against rotation relative to the respective link 52 and specifically its end 65. If desired, some form of self-locking thread or the like may be employed so as to preclude disassembly.

The end 64 of the other link is provided with an opening that is counterbored and is comprised of a smaller diameter portion 72 that clears with a slight clearance the shank portion 79 of the pivot pin 53 above its chamfered portion 71. A further chamfered portion 73 of the pivot pin 53 above the shank 79 is engaged with a chamber 74 of the end 64 formed at the base of its larger diameter portion 75. A head portion 76 of the pivot pin 53 is formed above a shouldered portion 77 formed immediately above the chamfered portion 73 and has a specially configured shape such as an oval shape, as shown in FIG. 5, so as to receive a special tool for threading it into a locked relationship. When so assembled, a lower surface, indicated generally by the reference numeral 78 of the end portion 64 will be spaced from the surface 68 and this spacing is shown in FIGS. 3 and 4 but in an exaggerated fashion inasmuch as the clearance is not as large at it would appear. This defines a pivot axis 80 about which the two links 52 will pivot.

In a conventional structure, the facing surfaces 68 and 78 of the end fittings 64 and 65 will be spaced apart by a small gap and these surfaces are generally planar. As a result, it is possible to insert a fine tool such as a chisel or the blade of a hacksaw and the lock can be broken by cutting through the shank portion 79 of the pivot pin 53. In accordance with an important feature of the invention, the surfaces 68 and 78 are configured so as to occlude this gap so that the outer surface of the pivot pin 53 will not be accessible through the gap. FIG. 4 is an enlarged view of this area and illustrates how this result is achieved.

In this embodiment, the surfaces 68 and 78 have respective concave and convex portions, indicated generally by the reference numerals 81 and 82, respectively. These surfaces define a gap 83 but it will be seen that because of the inclination of these surfaces the gap does not extend all the way through in line with the shank portion 79 of the pivot pin 53 and hence a tool, indicated by the reference numeral 84 which is placed into this gap in the direction of the arrow cannot attack or contact the pivot pin 53.

At the base of these concave and convex surfaces 81 and 82, the surfaces 68 and 78 have flat portions 85 and 86. However, the overall configuration is such that there will be no direct access through which any tool can be passed. Said another way, looking in the direction of the gap 83 and perpendicular to the axis of the pivot pin 53, the pivot pin 53 cannot be viewed nor cannot be directly accessed. As a result, it is not possible for anyone to break this lock by sawing through or breaking the pivot pin 53 itself. The actual end fittings 64 and/or 65 must be broken in order to attack the device successfully.

Figure 5:
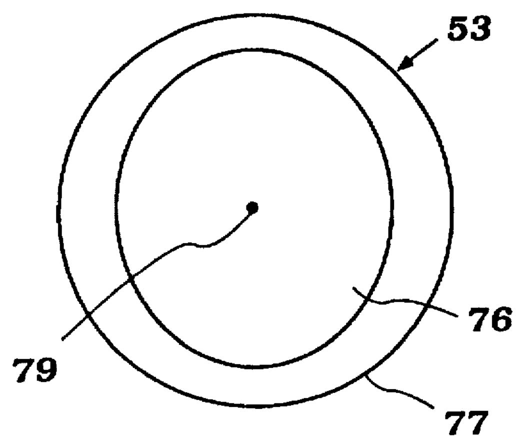
FIG. 5 is an end view looking in the direction of the arrow 5 in FIG. 3 and shows the head of the pivot pin.
Figure 6:
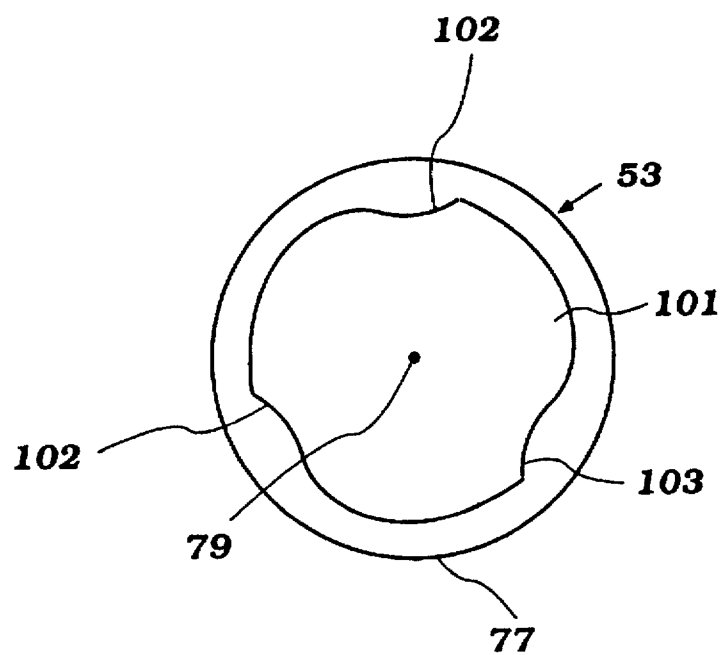
FIG. 6 is an end view, in part similar to FIG. 5, and shows another embodiment of the invention.

As has been noted by reference to FIG. 5, the head portion of the locking pin 53 is specially configured so as to accommodate a special tool for fastening but to reduce the likelihood of theft. FIG. 6 shows another head configuration, indicated generally by the reference numeral 101 which has a different fastening configuration having recesses 102 for receiving an appropriate but nevertheless special tool. Of course, various other attachment methods may be made as will be apparent to those skilled in the art.

Figures 7, 8:
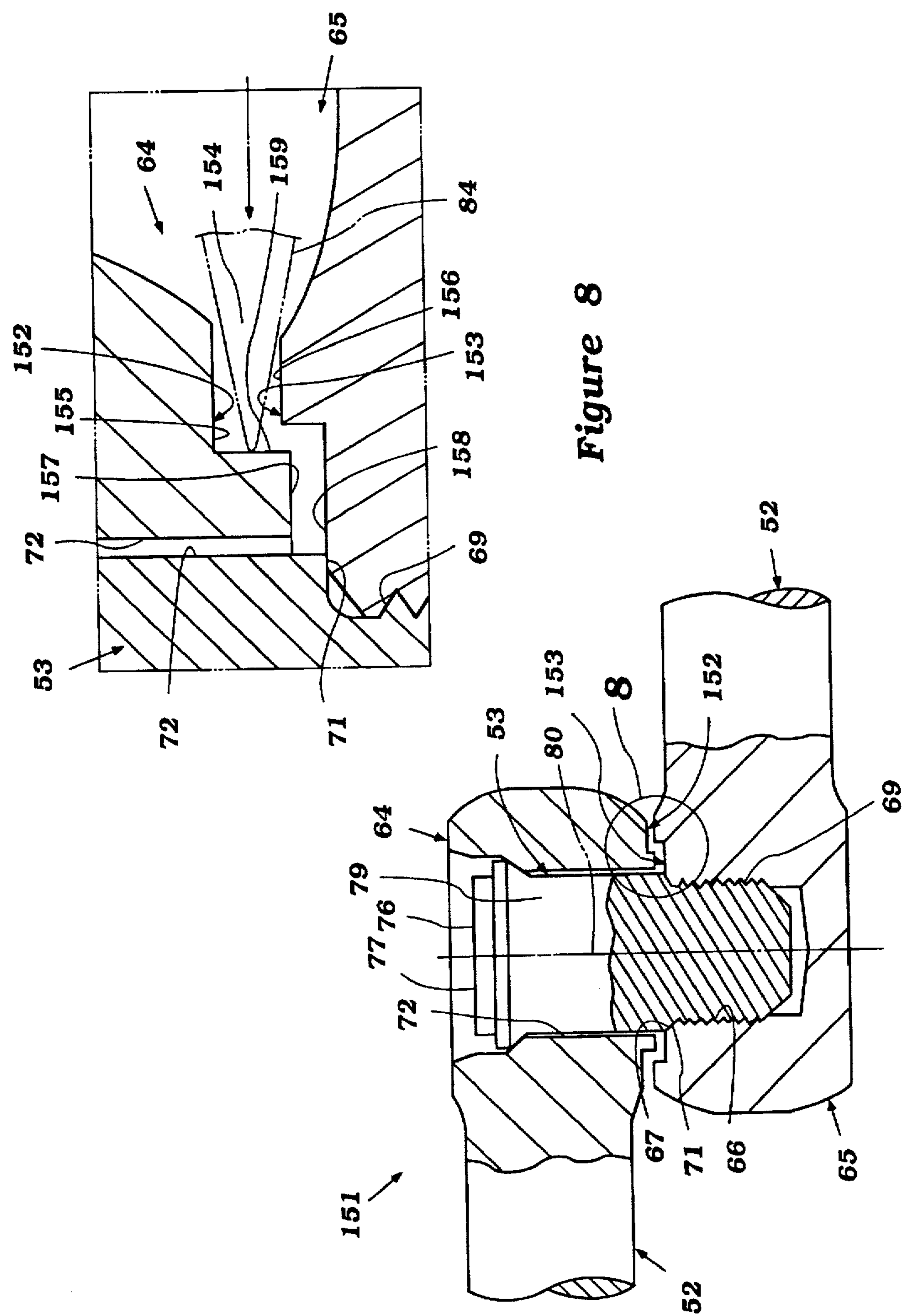
FIG. 7 is a view in part similar to FIG. 3 and shows another embodiment of the invention.
FIG. 8 is an enlarged view of the area encompassed by the circle 8 in FIG. 7.

FIGS. 7 and 8 show another embodiment of the invention which differs from the embodiment of FIGS. 1–5 only in the structure for occluding the shank 79 of the pin 53 from attack. For that reason, where components of this embodiment, which is indicated generally by the reference numeral 151, are the same as those previously described, they have been identified by the same reference numerals and will only be described again insofar as is necessary to understand the construction and operations of this embodiment.

In this embodiment, the end portion 64 and 65 have facing surfaces 152 and 153, respectively, which are configured so as to occlude the portion of the shank 79 of the pivot pin 53 from attack.

This defines a gap 154 through which the pivot pin 53 cannot be reached by the straight-sided tool 84 such as chisel or hacksaw. This gap is in essence formed by a pair of stepped counterbores so that the portion 152 has a generally convex shape and the portion 153 has a generally concave shape. This is comprised of a pair of first surfaces 155 and 156 on the end portions 64 and 65, respectively, which are generally annular and which define the outer portion of the gap 154. A second pair of generally annular surfaces 157 and 158 are formed inwardly of the surfaces 155 and 156, respectively, but are of a different diameter so as to form a cylindrical surface 159 which extends below the surface 156 and thus prevents the tool 84 from attacking the pivot pin 53 as clearly shown in FIG. 8.

Figure 9:
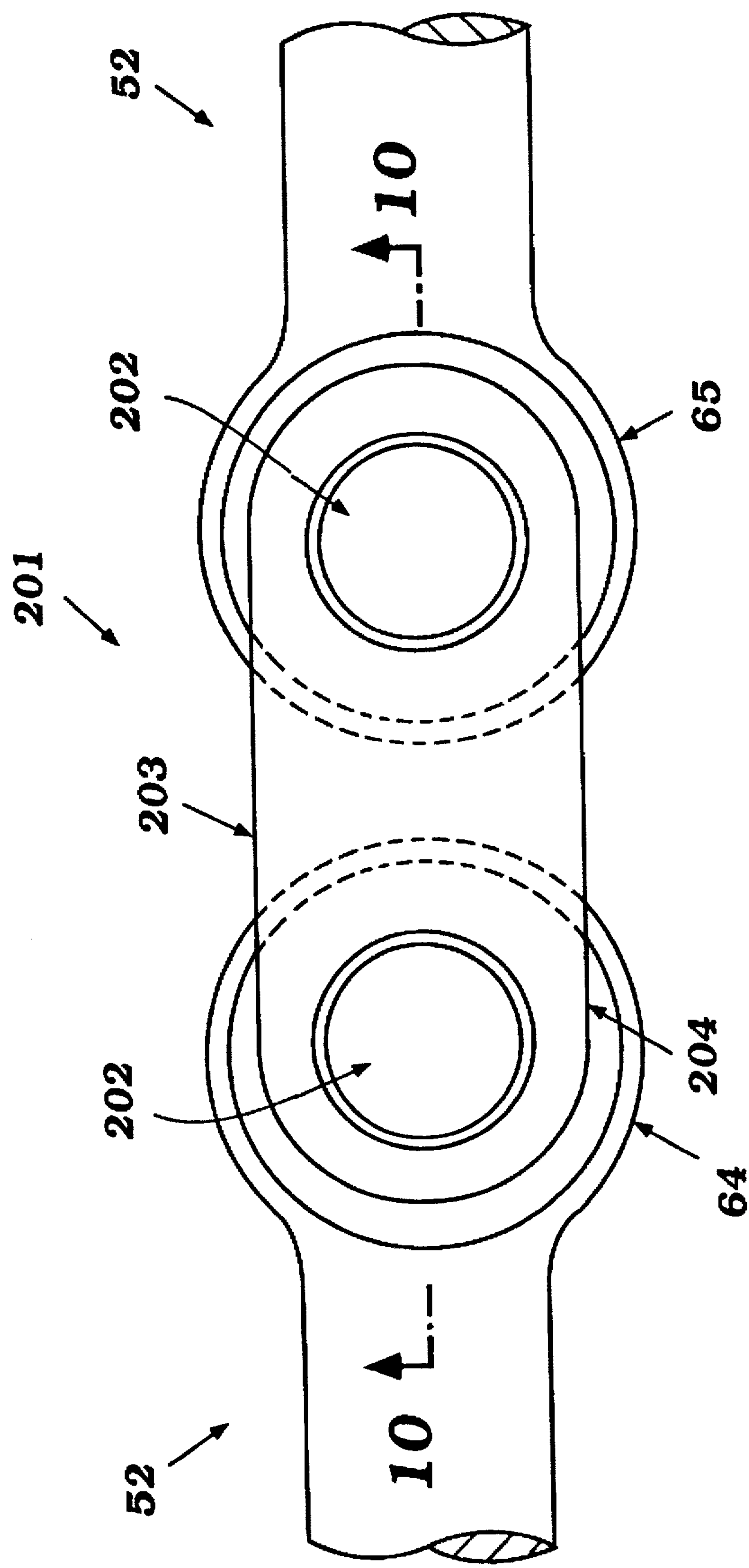
FIG. 9 is an enlarged top plan view, in part similar to FIG. 2 but showing only a single pivotal connection between two of the locking members, of another embodiment of the invention.
Figure 11:
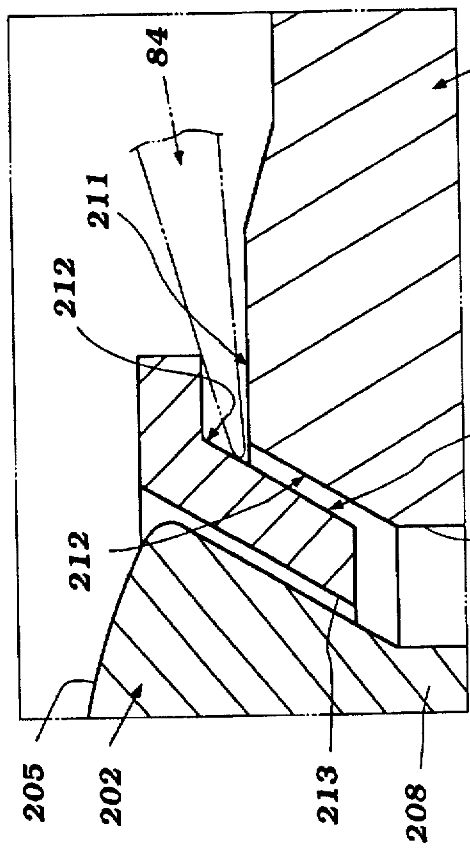
FIG. 11 is an enlarged view of the area encompassed by the circle 11 in FIG. 10.
Figure 10:
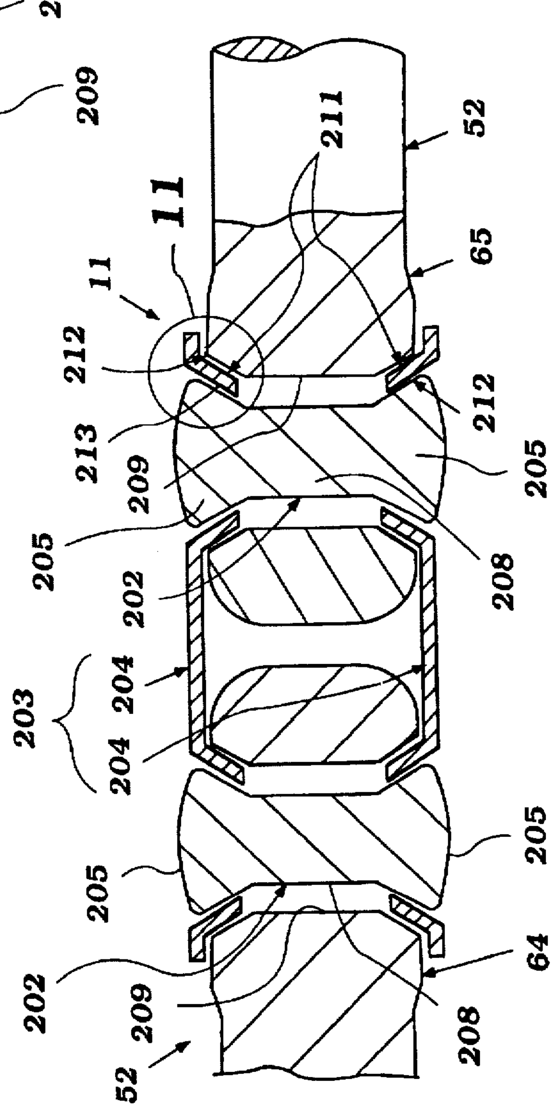
FIG. 10 is a cross-sectional view taken along the line 10—10 of FIG. 9.

FIGS. 9–11 show another embodiment of the invention using a slightly different connective joint between the elongated members, again the members 52 being illustrated in this figure. This joint is indicated generally by the reference numeral 201 and again connects end portions which are identified by the same reference numerals as previously described, due to the similarity in their construction.

This construction uses a pair of pivot pins, indicated generally by the reference numeral 202 which connect the elongated member end portions 64 and 65 through a link assembly, indicated generally by the reference numeral 203. This link assembly includes a pair of generally identically configured links, each indicated generally by the reference numeral 204 which are disposed on opposite sides of the end portions 64 and 65. This joint shows in most detail in FIG. 10 with the protective arrangement being shown in most detail in FIG. 11.

Viewing these figures, it is normally the practice for the pivot pins 202 in this type of arrangement to have upset heads 205 which engage the outer surface of the links 204 and their shanks 206 to pass through cylindrical openings 209 in the elongated member ends, again indicated by the reference numerals 64 and 65.

This thus leaves the construction in such a way that there is a gap through which the pivot pins 202 may be attacked and cut. In accordance with the invention, however, the links 204 and the end portions 65 are provided with cooperating respective surfaces 211 and 212 which in effect occlude or protect the pins 202 from attack. The surfaces 211 of the links 204 are provided by bending or folding in the portions of the links 204 that define the openings through which the pivot pins 202 extend, as shown at 213. In a like manner, the heads 205 are formed with a tapered complimentary surface so as to obscure the pins 202 from attack by a tool such as a flat bladed chisel or hacksaw 84 as shown in FIG. 11. Thus, again the gap between the pivotally connected members is occluded by the configuration and successful attack is not possible or alternatively extremely difficult.

Figures 12, 13:
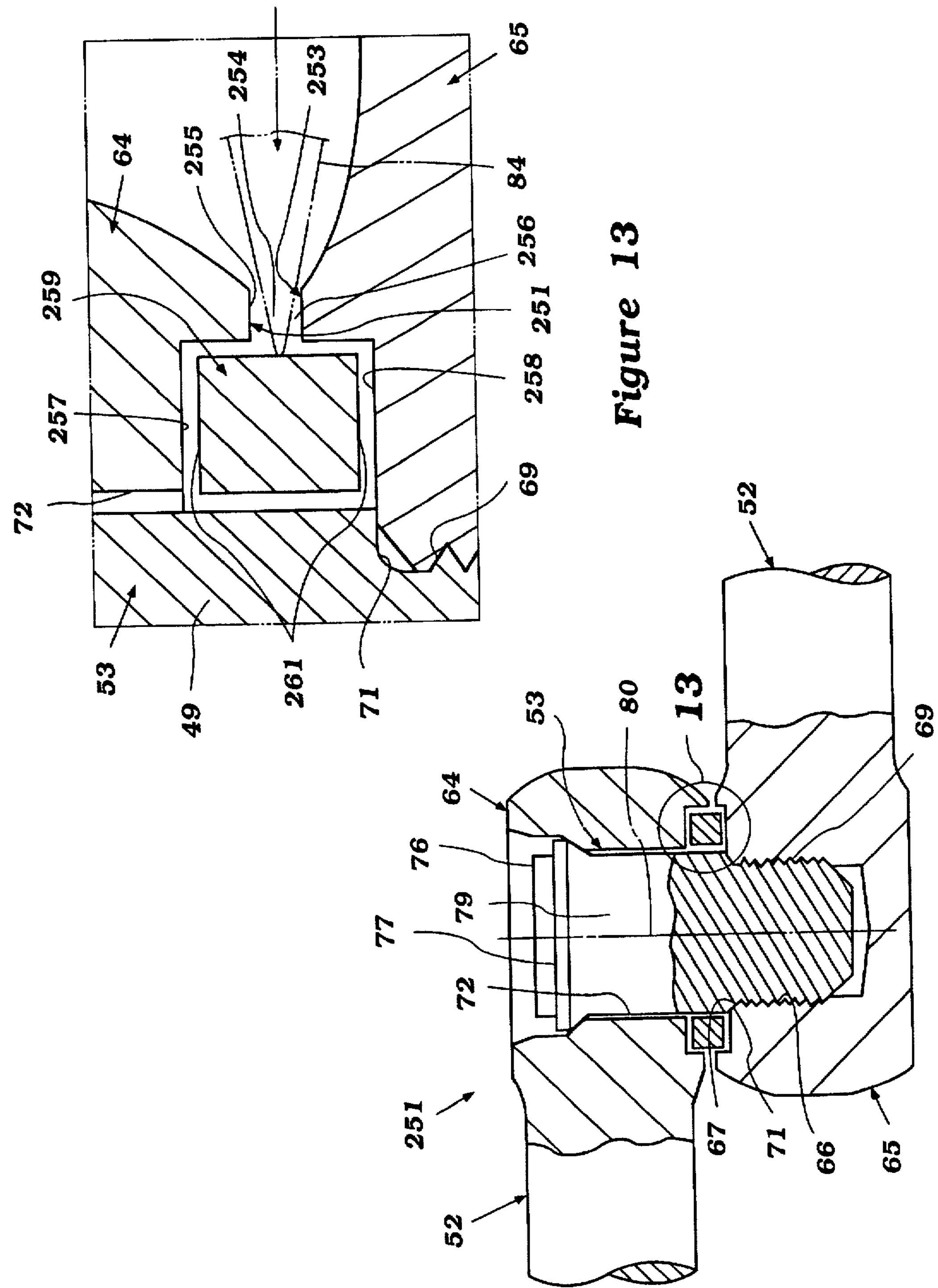
FIG. 12 is a view in part similar to FIGS. 3 and 7 and shows another embodiment of the invention.
FIG. 13 is an enlarged view of the area encompassed by the circle 13 in FIG. 12.

Another embodiment of protective joint is shown in FIGS. 12 and 13 and is identified generally by the reference numeral 251. Like the previously described embodiments, this embodiment differs from those already described only in the configuration of the protective part of the joint that protects the pivot pin. This construction is like the embodiments of FIGS. 1–5, 7 and 8 and thus components of this embodiment which are the same as those embodiments have been identified by the same reference numerals and will be described again only insofar as is necessary to understand the construction and operation of this embodiment.

In this embodiment, the end portions 64 and 65 have facing surfaces 252 and 253, respectively, which normally would form a gap 254 through which the pivot pin 53 and specifically its shank portion 79 might be attacked. However, inwardly from planar portions 255 and 256, there are provided with counterbored-like portions 257 and 258 which define a cavity in which a hardened occluding member, indicated generally by the reference numeral 259 is received. The member 259 has a pair of surfaces 261 that face the surfaces 257 and 258 but which are spaced slightly therefrom (the clearance being exaggerated in the figures) so that the member 259 may axially rotate in the gap formed by the surfaces 257 and 258. Hence, if a tool 84 is forced into the gap 254, it will contact the occluding member 259. Any attempts to try to cut the occluding member will merely cause it to rotate in the gap between the surfaces 257 and 258 and the pivot pin 253 will not be capable of being attacked nor will it be possible to cut the occluding member 259.

Figure 14:
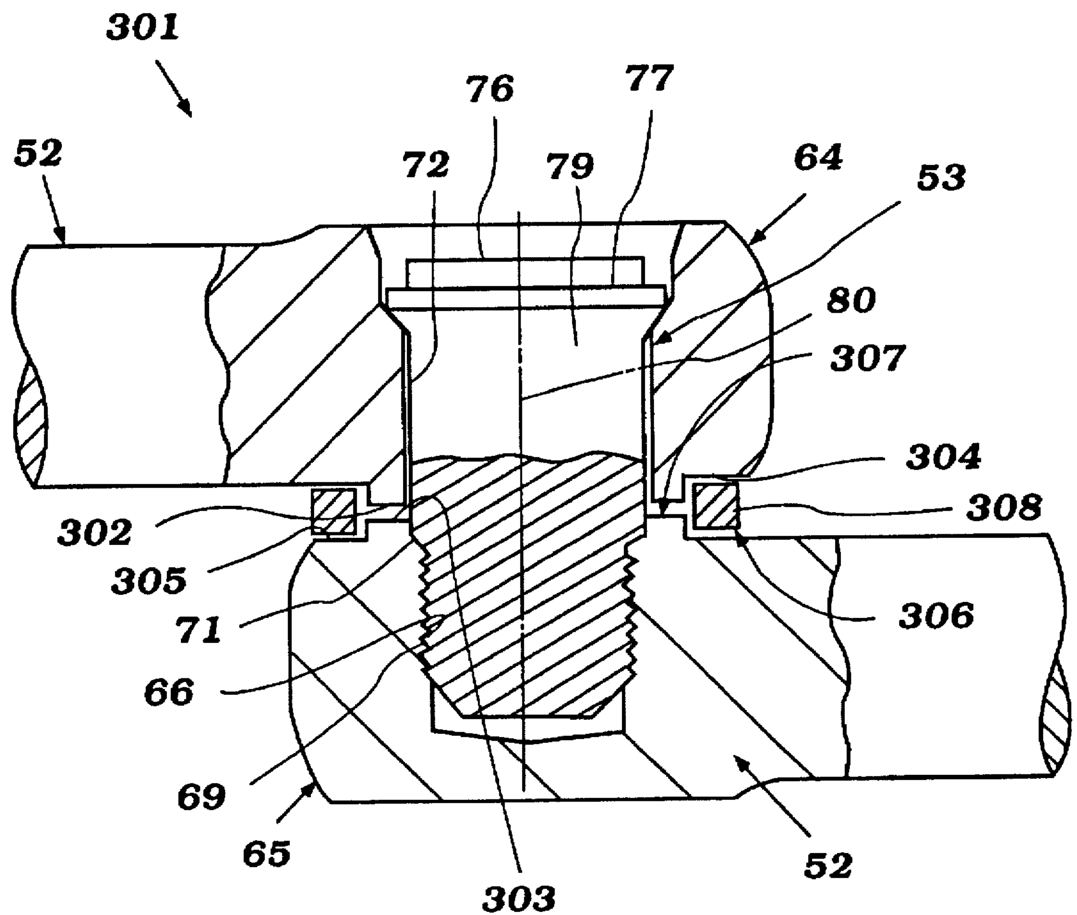
FIG. 14 is a view, in part similar to FIGS. 3, 7 and 12 and shows a still further embodiment of the invention.

A further type of protected joint constructed in accordance with another embodiment of the invention is depicted in FIG. 14 and is identified by the reference numeral 301. This embodiment is similar to and works on the same principal as the embodiment of FIGS. 12 and 13, and for that reason, components of this embodiment which are the same as those previously described and particularly those of FIGS. 12 and 13 have been identified by the same reference numerals and will be described again only insofar as is necessary to understand the construction and operation of this embodiment.

In this embodiment, the end portions 64 and 65 have facing surfaces 302 and 303 which define a gap therebetween. These surfaces, however, are formed outwardly therefrom with stepped outer surfaces 304 and 305 that receive a hardened occluding member, indicated generally by the reference numeral 306 which is positioned outwardly of the gap 307 defined by the surfaces 302 and 303 and thus occludes this gap. The hardened member 306 has an outer surface 308 which is in occluding relationship to the gap 307 and its end portions are spaced inwardly from the surfaces 304 and 305 and hence can rotate therein like the embodiment of FIGS. 12 and 13 so as to resist attack and protect the pivot pin 53 from being cut by a flat tool such as a chisel or hacksaw.

It should be readily apparent from the foregoing description that the thus far described constructions are extremely effective in insuring that the lock assembly cannot be forcibly broken through various means of protecting the pivot shafts 53 from being cut by either a flat tool such as a chisel or a hacksaw. This is done by occluding the area between the pivotally connected members from attack by a tool. As has also been noted, in addition to this problem there is also a further disadvantage with the prior art pivotal constructions in installation. Due to the weight of the elements and their pivotal connections, it may be difficult to manipulate them into place by holding them in a condition shown in phantom in FIG. 2 since the links 52 may easily pivot. Therefore, it is also desirable to provide an arrangement for restraining that pivotal movement to make assembly easier and next will be described a series of embodiments where the degree of movement is restrained by a frictional device that is incorporated in the pivotal connection. It is to be understood, however, that this frictional device may also be used in combination with the occluding types of constructions previously described and it is believed obvious to those skilled in the art how these arrangements may be used in combination.

Figure 15:
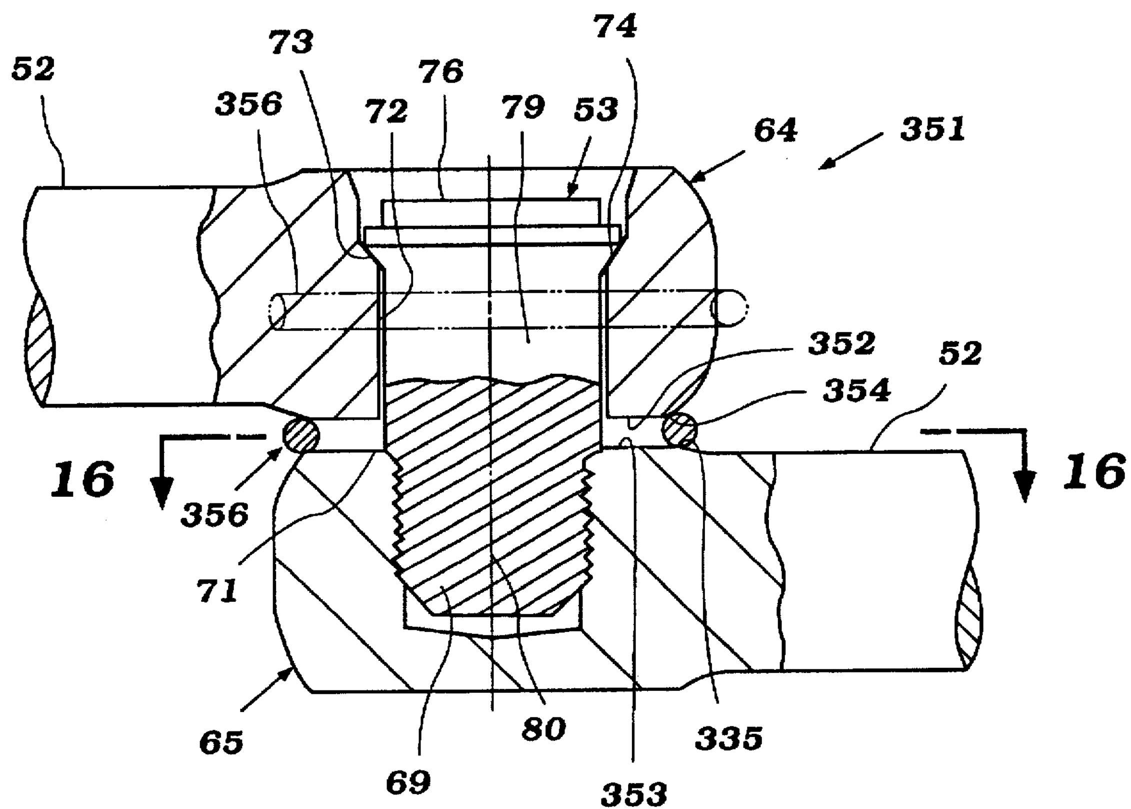
FIG. 15 is a view, in part similar to FIGS. 3, 7, 12 and 14 and shows a still further embodiment of the invention.
Figure 16:
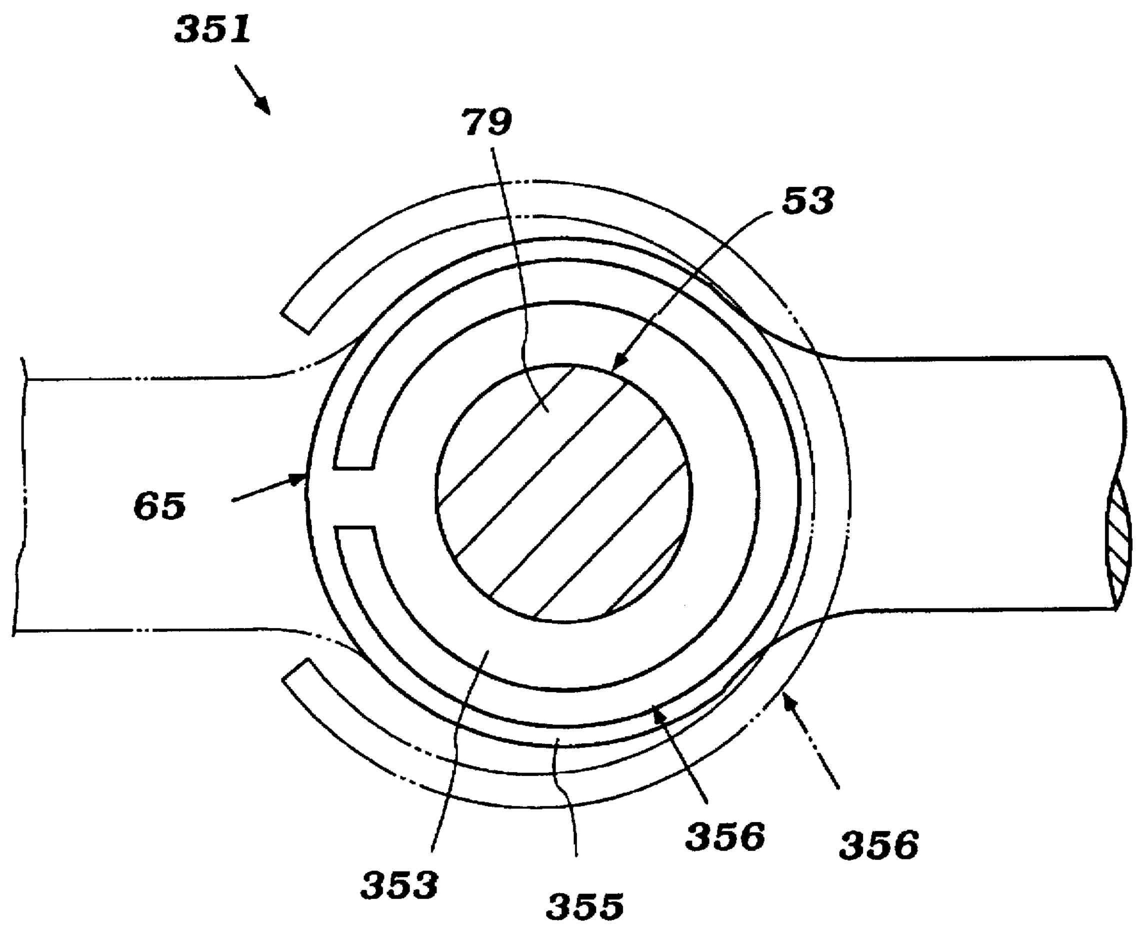
FIG. 16 is a cross-sectional view taken along the lines 16—16 of FIG. 15 and shows the frictional member in an installed position in solid lines and in a partially installed position in phantom lines.

The first type of joint constructed in accordance with this feature of the invention is shown in FIGS. 15 and 16 and is identified generally by the reference numeral 351. Again, this construction is basically of a type shown in FIGS. 1–5 and, for that reason, only the joint is shown and where components are the same as those previously described, they will be identified by the same reference numerals and will not be described again, except insofar as may be necessary to understand the construction and operation of this embodiment. In this embodiment, the pivotal connection provided by the pivot pin 53 is the same as that of FIGS. 1–4 and, therefore, this construction also will not be described again.

In this embodiment, surfaces 352 and 353 of the end portion 64 and 65 face each other and define a gap around the outer periphery of the shank portion 79 of the pivot pin 53. The outer portion of the surfaces 352 and 353 are curved or inclined as at 354 and 355. A resilient element, indicated generally by the reference numeral 356 and which may be formed from a material such as a spring steel or wire rod formed from a spring material such as stainless, phosphor-bronze, etc. is formed in a C-shape having a somewhat larger diameter of that of the surfaces 354 and 355 as shown in phantom in FIG. 16. This spring rod 356 is then deformed into resilient engagement with the surfaces 354 and 355 as shown in solid lines in FIG. 16 so as to exert an axial force urging the end portions 64 and 65 away from each other. This places a frictional force on the chamfered surfaces 73 and 74 which will restrict or restrain pivotal movement but not completely preclude it. Hence, the frictional forces will insure that on installation the elements 52 will be maintained in the desired alignment but can be easily pivoted for insertion. Hence, the disadvantages of the prior art construction are avoided.

As has been noted, the construction of this and subsequent embodiments may be used in combination with any of the occluding structures as previously described, which can be formed radially inwardly from the spring-like elements 356, as should be readily apparent to those skilled in the art.

Figure 17:
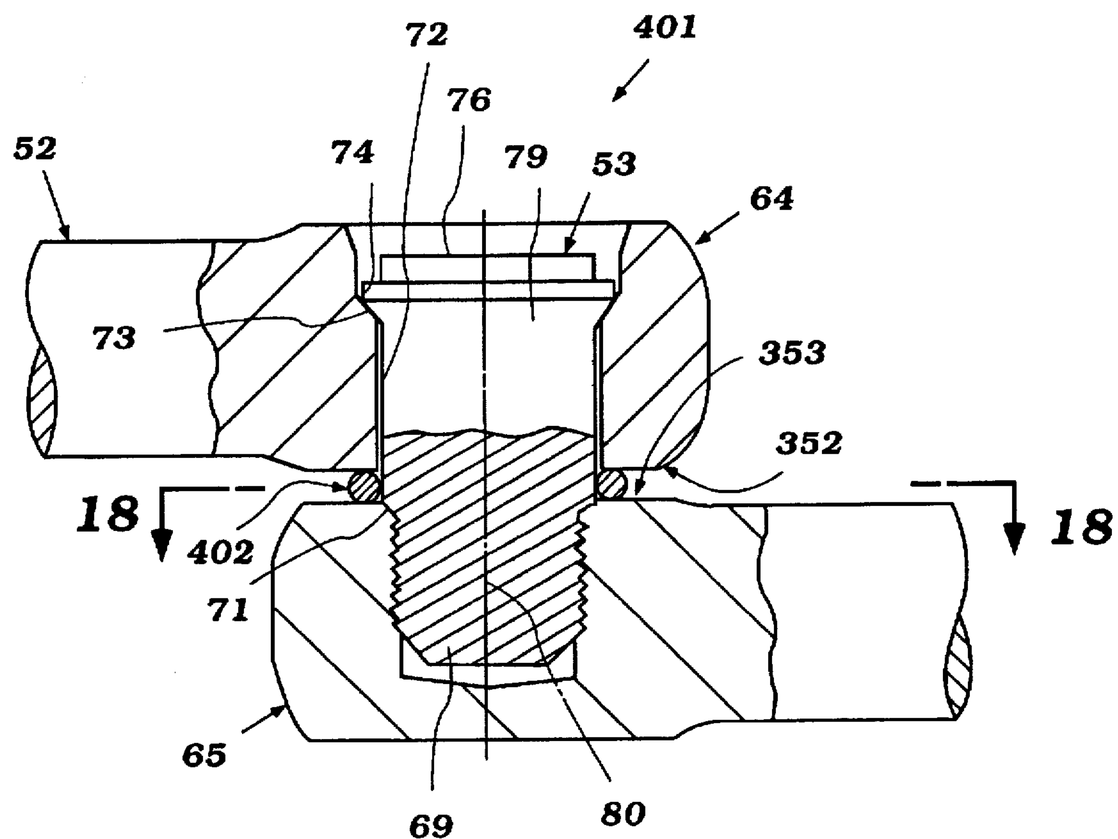
FIG. 17 is a cross-sectional view, in part similar to FIGS. 3, 7, 10, 12, 14 and 15, and shows still another embodiment of the invention.
Figure 18:
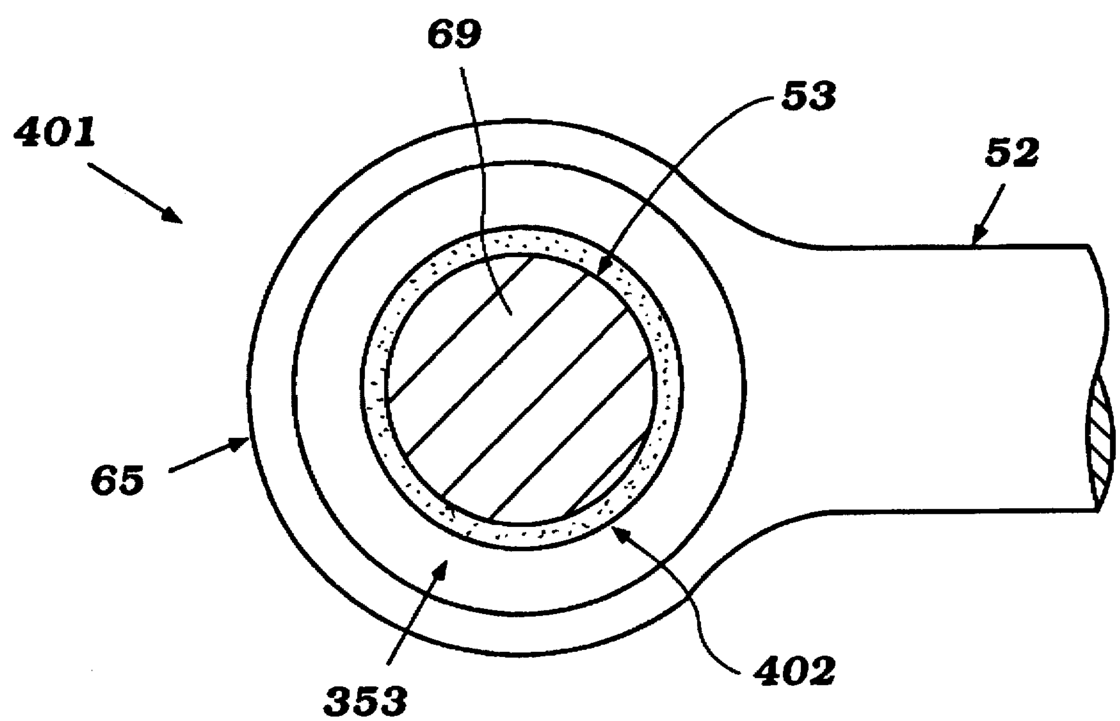
FIG. 18 is a cross sectional view taken along the line 18—18 of FIG. 17.

FIGS. 17 and 18 show another embodiment of the invention, indicated generally by the reference numeral 401 which is basically the same as the embodiment of FIGS. 15 and 16 except for the type of resilient frictional inducting member employed. For that reason, components of this embodiment which are the same as that previously described have been identified by the same reference numerals and will not be described again, except insofar as is necessary to understand the construction and operation of this embodiment. In this embodiment, an annular o-ring, indicated generally by the reference numeral 402, which may be formed from any known type of material such as a synthetic rubber, actual rubber, a resilient resin or the like is interposed between the surfaces 352 and 353 and is resiliently loaded upon assembly of the pivot pin 43 into the joint. This will induce sufficient frictional force between the surfaces 73 and 74 to restrain free movement while, at the same time, permitting pivotal movement, but only when desired.

Figure 19:
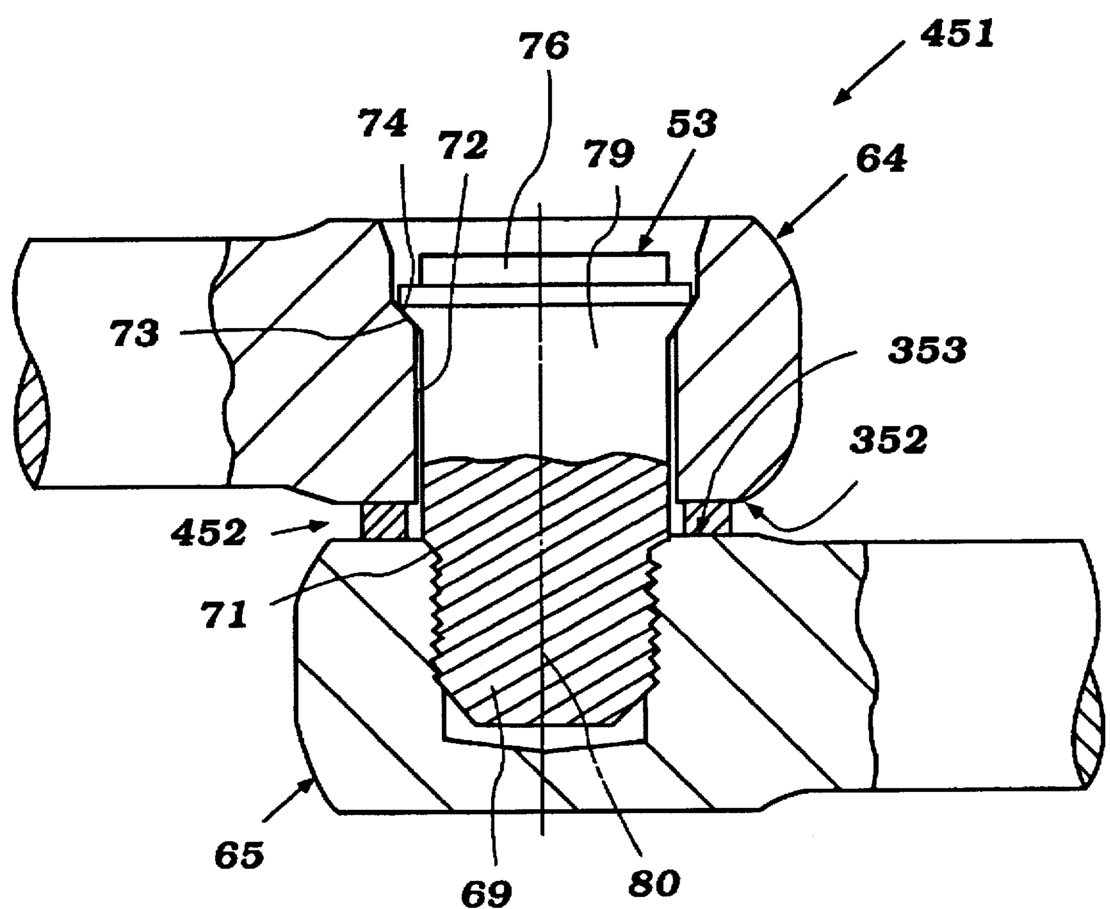
FIG. 19 is a cross-sectional view, in part similar to FIGS. 3, 7, 10, 12, 14, 15 and 17, showing another embodiment of the invention.

A joint constructed in accordance with another embodiment of the invention which is basically the same as the embodiment of FIGS. 17 and 18, is shown in FIG. 19 and is identified generally by the reference numeral 451. This embodiment differs from that of FIGS. 17 and 18 only in the use of a rectangular cross section elastic element, indicated generally by the reference numeral 452 that is disposed between the surfaces 352 and 353 of the end fittings 64 and 65, respectively. Again, the elastic ring 452 may be formed from any known material having the desired elastic properties.

Figure 20:
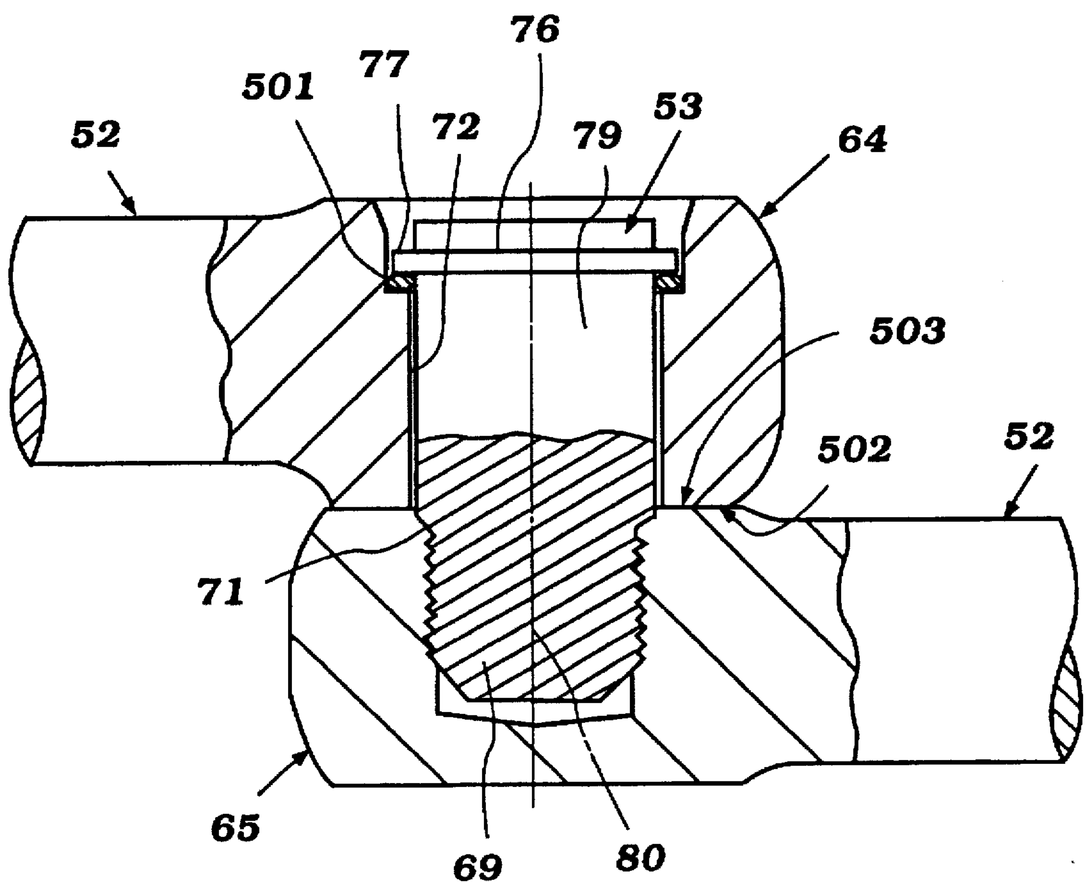
FIG. 20 is a cross sectional view, in part similar to FIGS. 3, 7, 10, 12, 14, 15 and 17, showing a still further embodiment of the invention.

FIG. 20 shows another embodiment of the invention which is like the embodiments of FIGS. 7, 18 and 19 and differs from them only in the positioning of the elastic element. In this embodiment, rather than employing the chamfered surfaces 73 and 74 between the head of the pivot pin 53 and the end fitting 64, there are provided flat surfaces in this area and an elastic element, indicated generally by the reference numeral 501 which may comprise an o-ring of any cross-sectional configuration is compressed between the pivot pin flange portion 77. When so loaded, the elastic member 501 exerts an axially force between the end portion 64 and 65 so as to bring their respective surfaces 502 and 503 into frictional engagement so as to further add to the frictional resistance to rotation. It should be noted that the elastic member 501 will also exert a frictional resistance to turning of the end portion 64 relative to it so as to further maintain the respective elongated members 52 in the desired alignment.

In all of the embodiments employing the elastic arrangement for providing a frictional force, formed round or circular springs and annular elastic springs have been disclosed. It is to be understood, of course, that other types of springs such as wave washers, bellville springs and the like may also be employed so as to provide the desired axial force to cause frictional resistance to free pivotal movement.

In addition to the use of elastic forces for restraining the pivotal movement, it is also possible to provide a positive stop in the pivotal connections which will restrict or limit the degree of pivotal movement so as to achieve the same result and also will insure that the assembly can only be folded in the way to permit the ends to be locked. Next will be described a series of such mechanical stop devices. It will be understood that these mechanical devices for limiting pivotal movement may also be employed in conjunction with the occluding arrangements as shown in the embodiments of FIGS. 1–5, 6, 7 and 8, 9–11, 12 and 13, and 14. In addition and if desired, the frictional resistance arrangements of the embodiments of FIGS. 15 and 16, 17 and 18, 19 and 20 may also be utilized in such a combination.

It should also be noted that because of the nature of the locking mechanism provided by the lock structure indicated at 56 in FIGS. 1–5, the lock assemblies, indicated generally by the reference numeral 41 can be only used when the elongated members are pivoted in a specific direction. That is, the end portions 54 and 57 can be only assembled in the direction as shown in FIG. 2 and if an attempt is made to fold the assembly in the opposite direction by rotating the links about the pivot pins 53 in the direction opposite from that shown in FIG. 2, locking will not be possible. Therefore, it is also desirable to provide a structure that will permit the pivotal movement in only one direction so as to insure against a failed attempt to lock the mechanism. The following embodiments also provide this insurance in a manner which will become apparent and first the embodiment of FIGS. 21–23 will be described which achieves these results in one way.

Again, this embodiment differs from the previously described embodiments only in the construction of the pivotal connection, indicated generally by the reference numeral 551 in this embodiment, and, for that reason, components which are the same as those previously described will have been identified by the same reference numerals and will be described again insofar as is necessary to understand the construction and operation of this embodiment.

Figure 21:
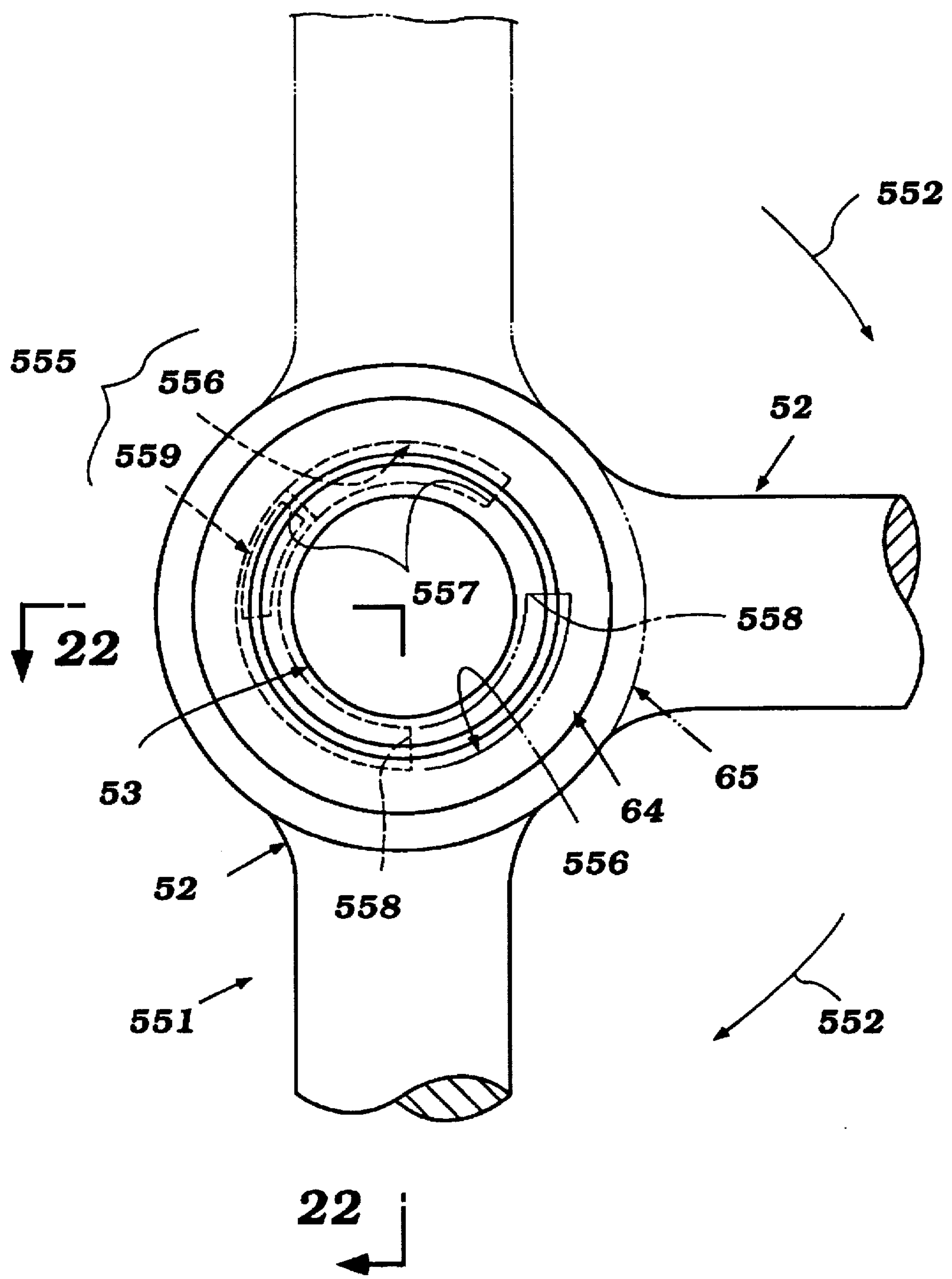
FIG. 21 is a top plan view of the pivotal connection of a lock constructed in accordance with a still further embodiment of the invention.
Figure 22:
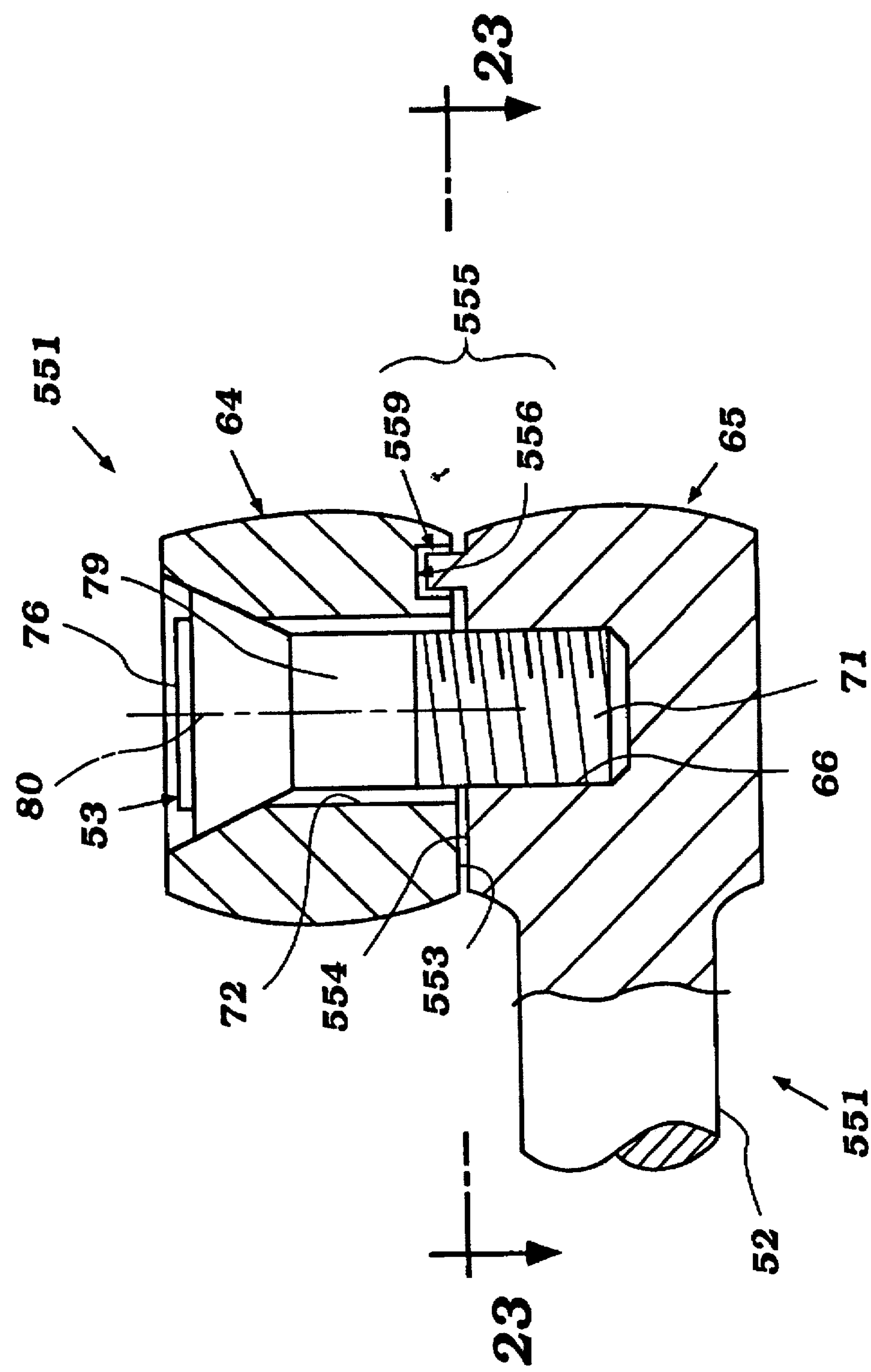
FIG. 22 is a cross-sectional view taken along the line 22—22 of FIG. 20.
Figure 23:
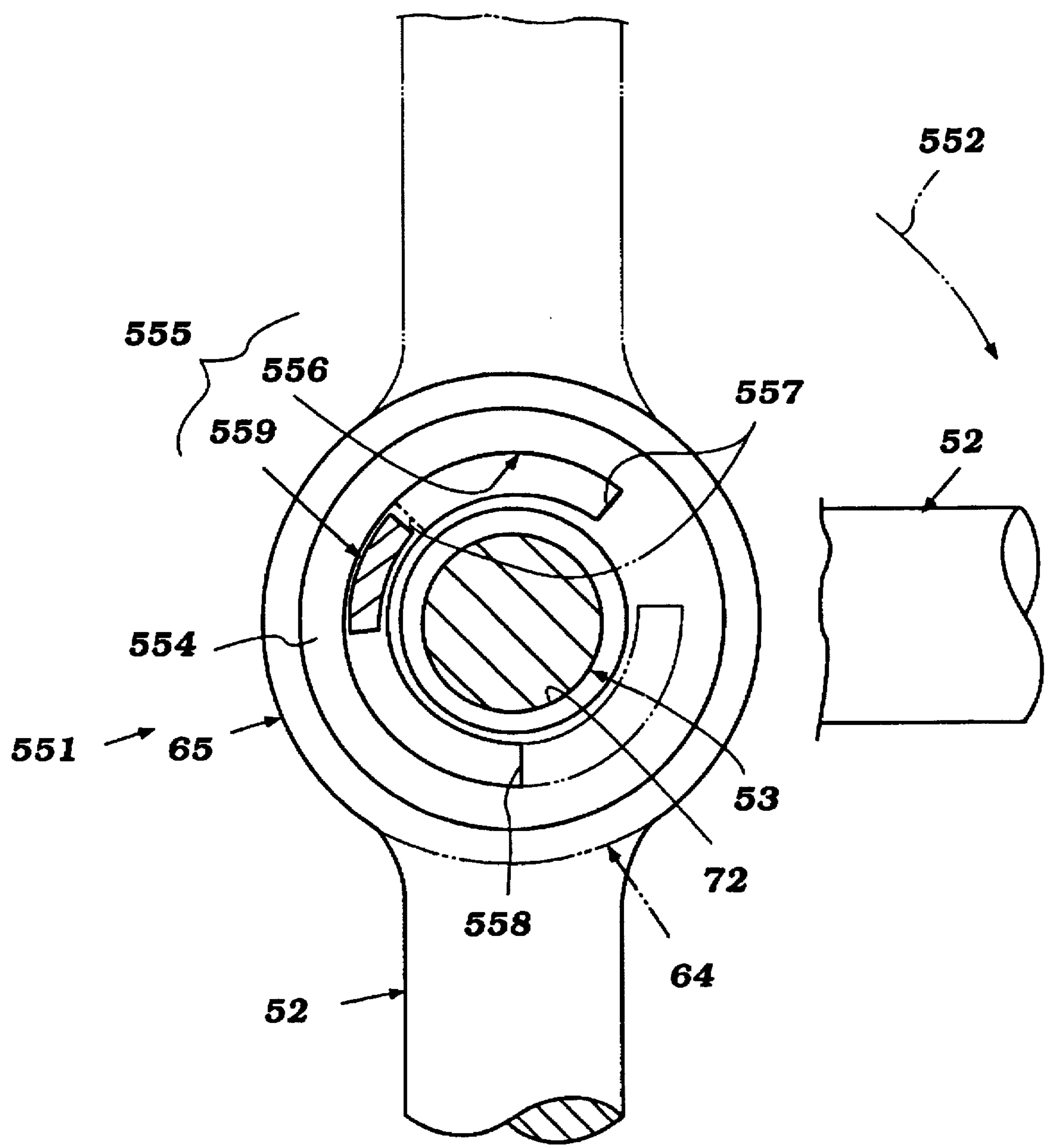
FIG. 23 is a cross-sectional view taken along the line 23—23 of FIG. 21 and shows how this embodiment operates so as to limit the degree of pivotal movement between the interconnected locking members.

The joint shown in FIGS. 21–23 is depicted as the joint that appears at the upper left hand side of FIG. 2 and illustrates that the joint permits rotation between the elements 52 in the direction indicated by the arrows 552 but will limit the degree of rotation or preclude rotation from the phantom line position in FIG. 21 in a direction opposite to the arrows 552 so that the lock mechanism can only be assembled or pivoted into the position shown in FIG. 2 so as to preclude against any inadvertent attempt to operate the locking mechanism in the wrong direction.

Like the previously described embodiments, the end portions 64 and 65 in this embodiment have facing surfaces 553 and 554 that define a gap therebetween. An interlock mechanism, indicated generally by the reference numeral 555 is provided in the area of these facing surfaces which interlock mechanism 555 limits the degree of relative pivotal movement and also permits primarily pivotal movement in the direction of the arrows 552 so as to permit the device to be operated in its normal locking mode but, at the same time, restrain pivotal movement in the opposite direction so as to insure that the device can be operated properly but only in the proper direction.

This interlocking mechanism 555 includes a circumferentially extending groove 556 that is formed in the surface 553 and which does not extend completely circumferentially around it so as to form a first end portion 557 and a second end portion 558 which end portions occur at the positions best shown in FIG. 23.

The locking mechanism 555 further includes a tab 559 that is formed integrally in the surface of 554 and which extends into the groove 556 as shown best in FIG. 23. Hence, the locking pin 556 and groove 559 provide a structure which will permit the elongated members 42 to be swung in a direction as shown in the arrow 552 during which swinging movement, assuming the link end 65 is held against movement will cause the slot 556 to move relative to the pin 559 until the end 558 contacts it to limit further movement. Rotation in the this direction will permit movement to the desired 90° position as shown at this particular joint. However, it will preclude movement greater than about 180° in the opposite direction so as to insure that the locking mechanism can only be swung in one direction. In addition, by placing the locking lug 559 in engagement with the end 557 further pivotal movement can be precluded upon installation.

Figure 24:
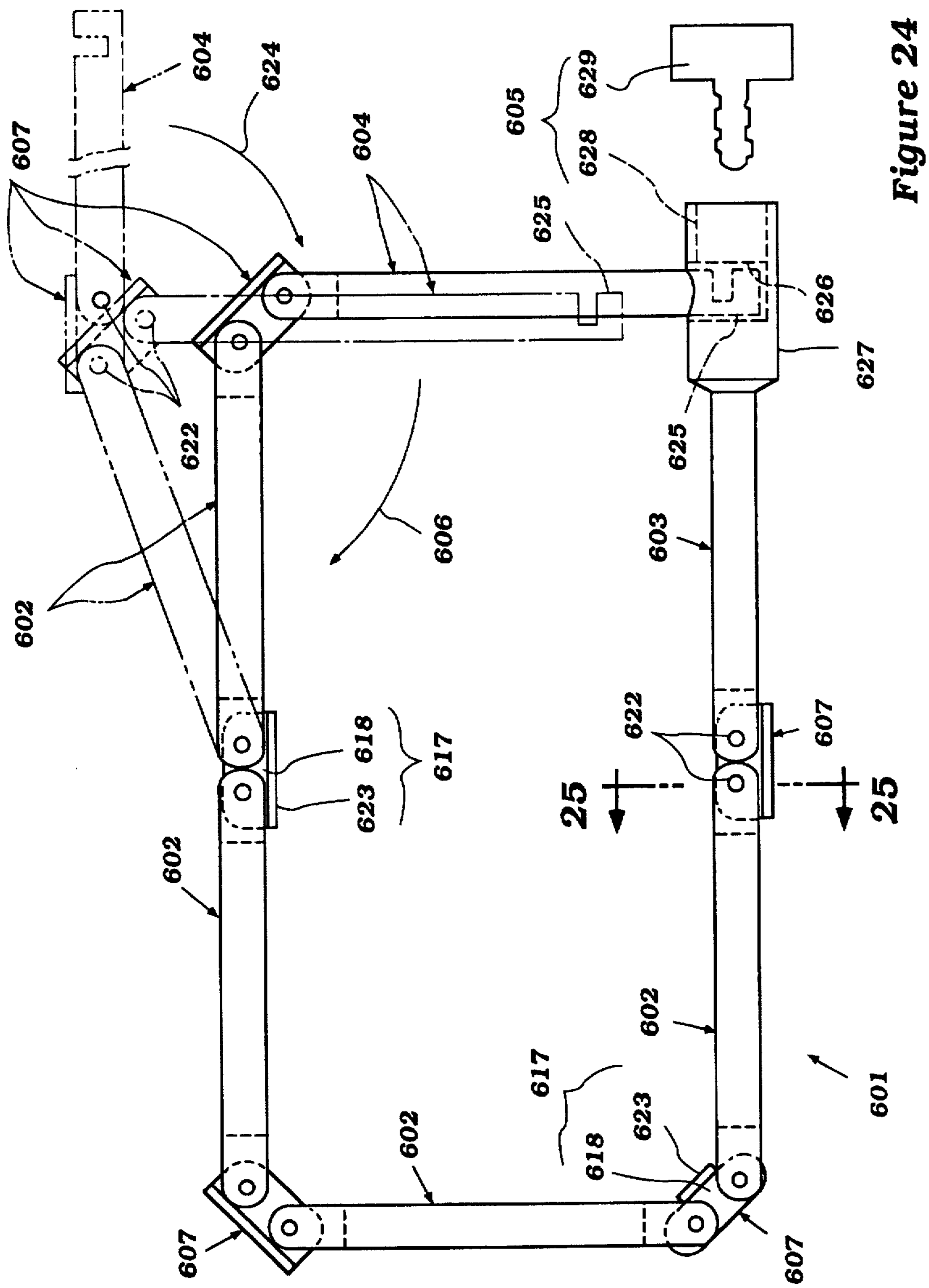
FIG. 24 is a top plan view, in part similar to FIG. 2, showing another embodiment of the invention with the lock in the locked position in solid line views and in a position immediately prior to locking in the phantom line views.
Figure 25:
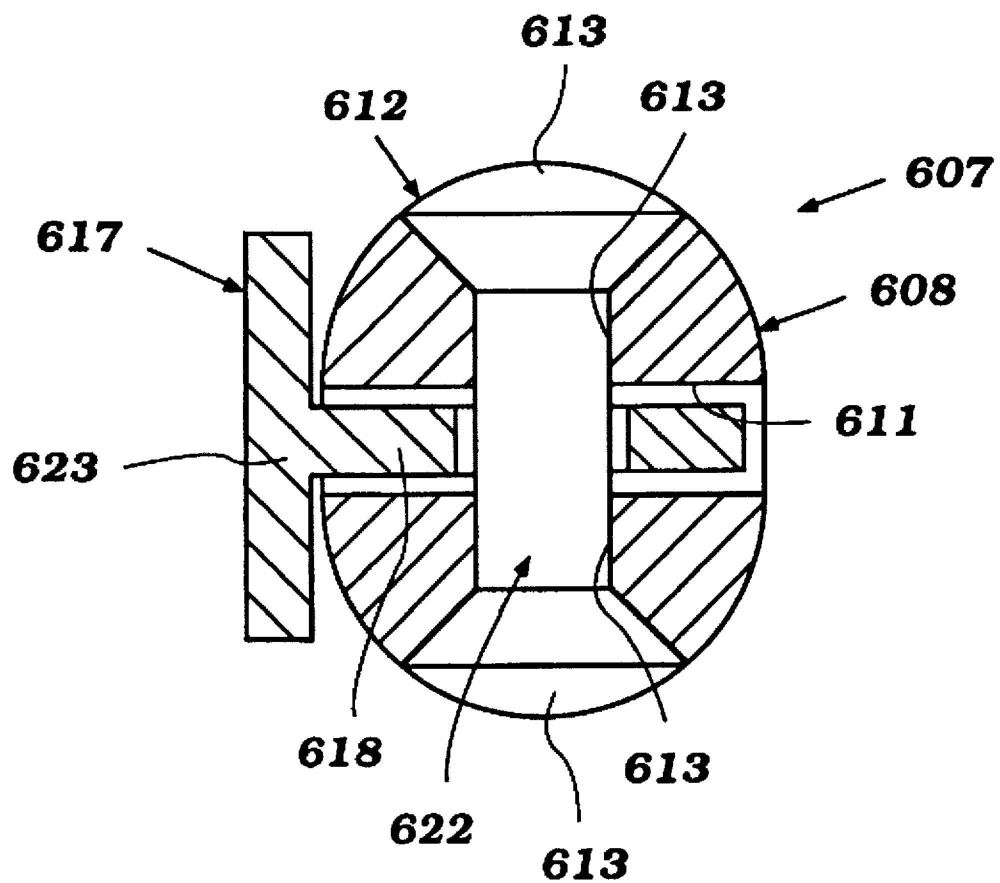
FIG. 25 is an enlarged cross-sectional view taken along the line 25—25 of FIG. 24.
Figure 26:
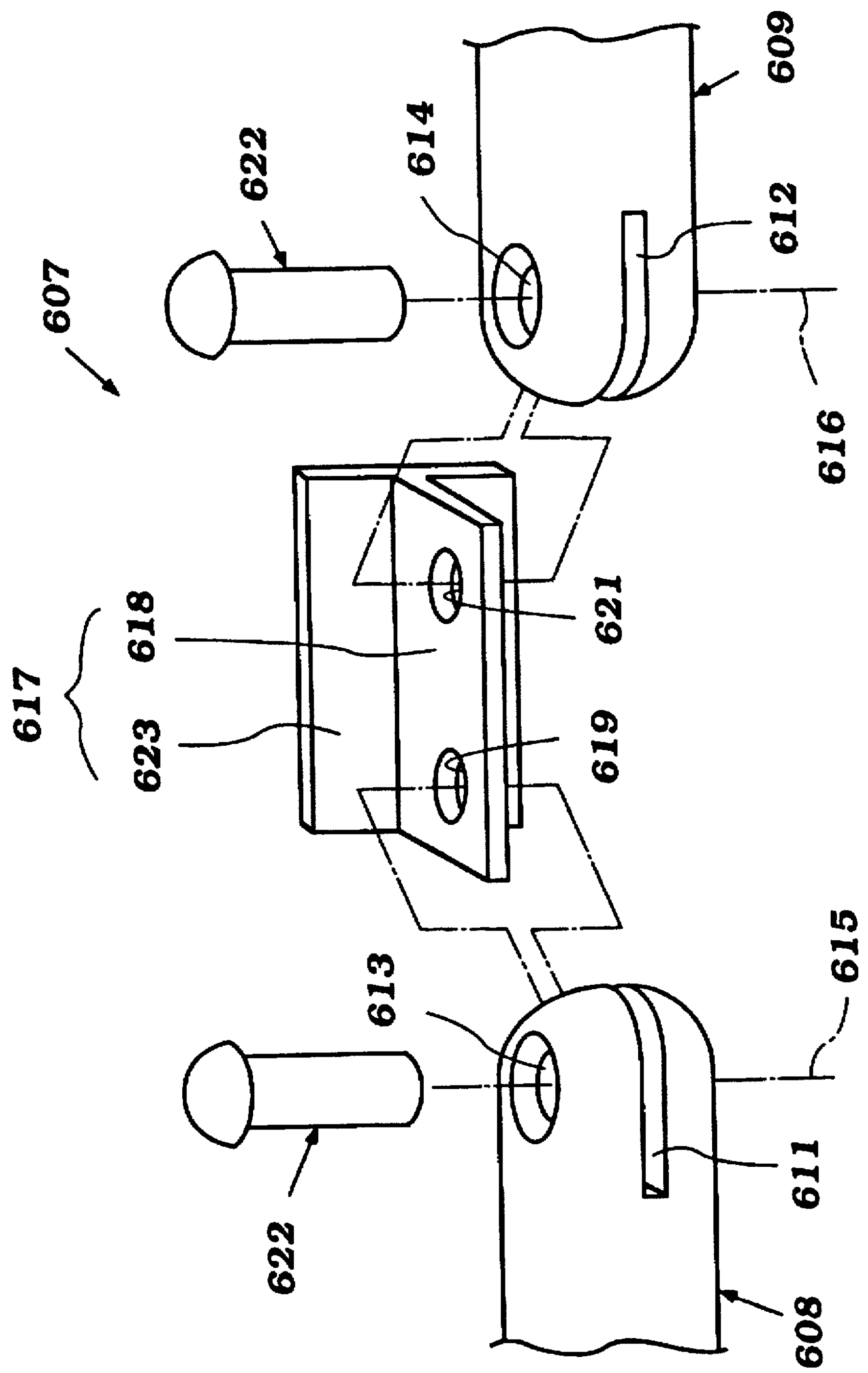
FIG. 26 is an exploded perspective view of this embodiment.

Referring now to the embodiment of FIGS. 24–26, a locking mechanism constructed in accordance with this embodiment of the invention is identified generally by the reference numeral 601. The locking mechanism 601 includes pivotal connections of the type shown in the embodiment of FIGS. 9–11 but also employs a mechanism for restraining the pivotal movement of the interconnected elongated members in one direction while permitting the desired degree of pivotal movement in the opposite direction. Although the embodiment of FIGS. 24–26 does not show the anti-attack or anti-theft features of the embodiment of FIGS. 9–11, it should be readily apparent to those skilled in the art how this anti-theft mechanism may be employed with this embodiment.

In this embodiment, the locking mechanism 601 also includes a plurality of pivotally interconnected elongated members with the intermediate members being indicated generally by the reference numeral 602 and the end members being indicated by the reference numerals 603 and 604, respectively. A locking mechanism, indicated generally by the reference numeral 605 is incorporated for locking the unpivoted ends of the end members 603 and 604 to each other. Like the previously described embodiments, this locking mechanism will only be operative if the members 602, 603 and 604 are pivoted in the direction shown by the arrow 606 in FIG. 24. Except for the locked ends of the M member 603 and 604, the opposite adjacent ends of all of the members 602, 603 and 604 are pivotally connected to each other by pivot connections, indicated generally by the reference numeral 607. The pivotal connection 607 are all the same in construction and this construction will be described in more detail by particular reference to FIGS. 25 and 26. The elongated member 602, 603 and 604 each have adjacent end portions 608 and 609 that are formed with slots 611 and 612, respectively. Drilled openings 613 and 614 extend through these slotted portions 612 and 613, respectively, and define pivot axes 615 and 616, respectively.

An interconnecting link, indicated generally by the reference numeral 617 is provided for pivotally connecting the ends 608 and 609 to each other and to the link 617. The link 617 has a generally T-shape in cross section and is comprised of a first, intermediate leg 618 in which a pair of openings 619 and 621 are formed. The leg 618 is adapted to be passed into the slots 611 and 612 with the openings 613 and 619 and 614 and 621 in alignment. Riveted pivot pins, indicated generally by the reference numeral 622 are then passed into the opening 613 and 614 and there heading complete so as to fix the pivot pin 622 to the member ends 608 and 609 and complete the pivotal connection.

It should be noted that all elements are, like those of previously described embodiments, formed from a case hardened high strength steel such as a chromium-molybdenum steel.

The link 617 is further provided, unlike prior art constructions, with a further leg 623 which extends perpendicularly to the leg 618 and is disposed so that when installed it will be disposed adjacent the ends 608 and 609 of the elongated members. These legs 623 function so as to permit pivotal movement in one direction to a substantially greater degree than in the other direction so that the locking mechanism 601 can only be folded into the shape shown in FIG. 24 and not in the opposite direction. The reason for this will be explained by reference to FIG. 24.

As noted, in this figure, the correct lock position is shown in solid line views. The phantom line views show, in the case of the pivotal connection between the end member 604 and its adjacent member 602 how the pivotal connections 607 and specifically the leg 623 of the member 617 functions to avoid the wrong degree of folding. As shown in the dash dot dot line view, if an attempt is made to fold the line 604 relative to the link 602 in a direction opposite to the arrow 624 and which would, if accomplished with the remaining links, cause the mechanism to be folded in such a way that the locking mechanism 605 could not be utilized. It will be seen that when this attempt is made, the link ends 608 and 609 will contact the leg 623 and further pivotal movement in the direction opposite the arrow 624 will be precluded.

Hence, the mechanism must be folded in the direction of the arrow 624 so as to be capable of being correctly installed. Because of this relationship, it should be noted that the positioning of the legs 623 relative to the adjoining links alternates along the length of the mechanism. That is, the connection 604 before the lengths 602 and 604 are on the outside while that between the next pair of elongated member 602 is on the inside and so on.

As with the previously described embodiments, the locking mechanism 605 includes a configured end 625 of the member 604 which is received in a complimentary recess 626 of a cylindrical locking member 627. This has a tumbler and latch element, the latter not being shown 628 which is locked by a key 629 when fully installed, as were the previously described embodiments.

Figure 27:
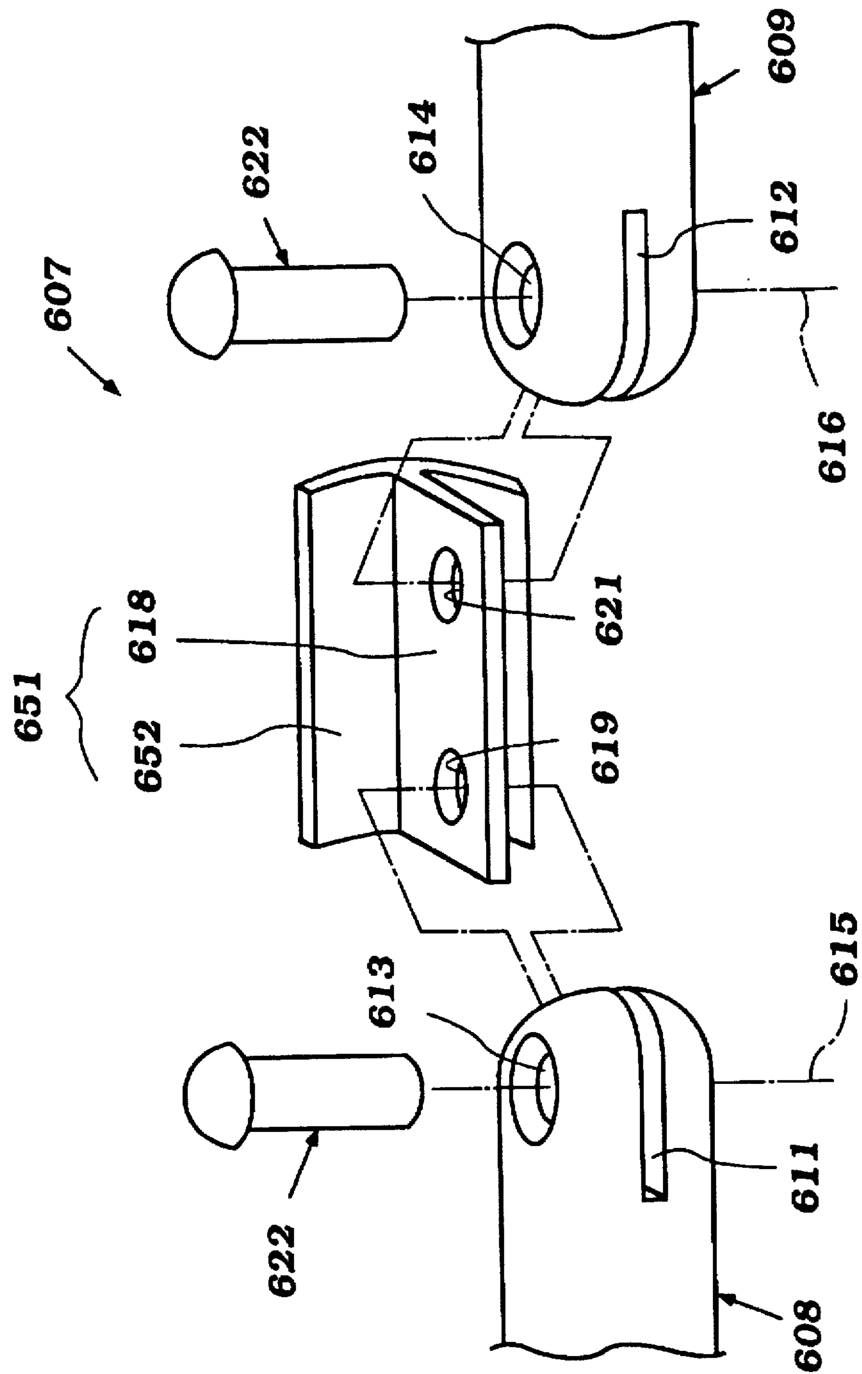
FIG. 27 is an exploded view, in part similar to FIG. 26, and shows another embodiment of the invention.

FIG. 27 shows another embodiment of the invention which is basically the same as the embodiment of the invention of FIGS. 24–26. The only difference between this embodiment and that of the previously described embodiment is the shape of the interconnecting links, indicated generally by the reference numeral 651 in this figure. The link 651 has a first leg which is the same as the corresponding leg of the link 617 of the previously described embodiment and thus this leg and all other components which are the same have been identified by the same reference numerals and will not be described again except insofar as is necessary to understand the construction and operation of this embodiment.

In this embodiment, the connecting link 651 has a curved leg portion 652 which serves the purpose of contacting the end 608 and 609 for limiting the degree of pivotal movement. The degree of curvature is complimentary to the curvature of the ends of the link 608 and 616 but still is shaped adequately so as to provide a stop arrangement. Aside from this difference, this embodiment is the same as that of the embodiment of FIGS. 24–26 and, for that reason, further description of this embodiment is not believed to be necessary.

Figure 28:
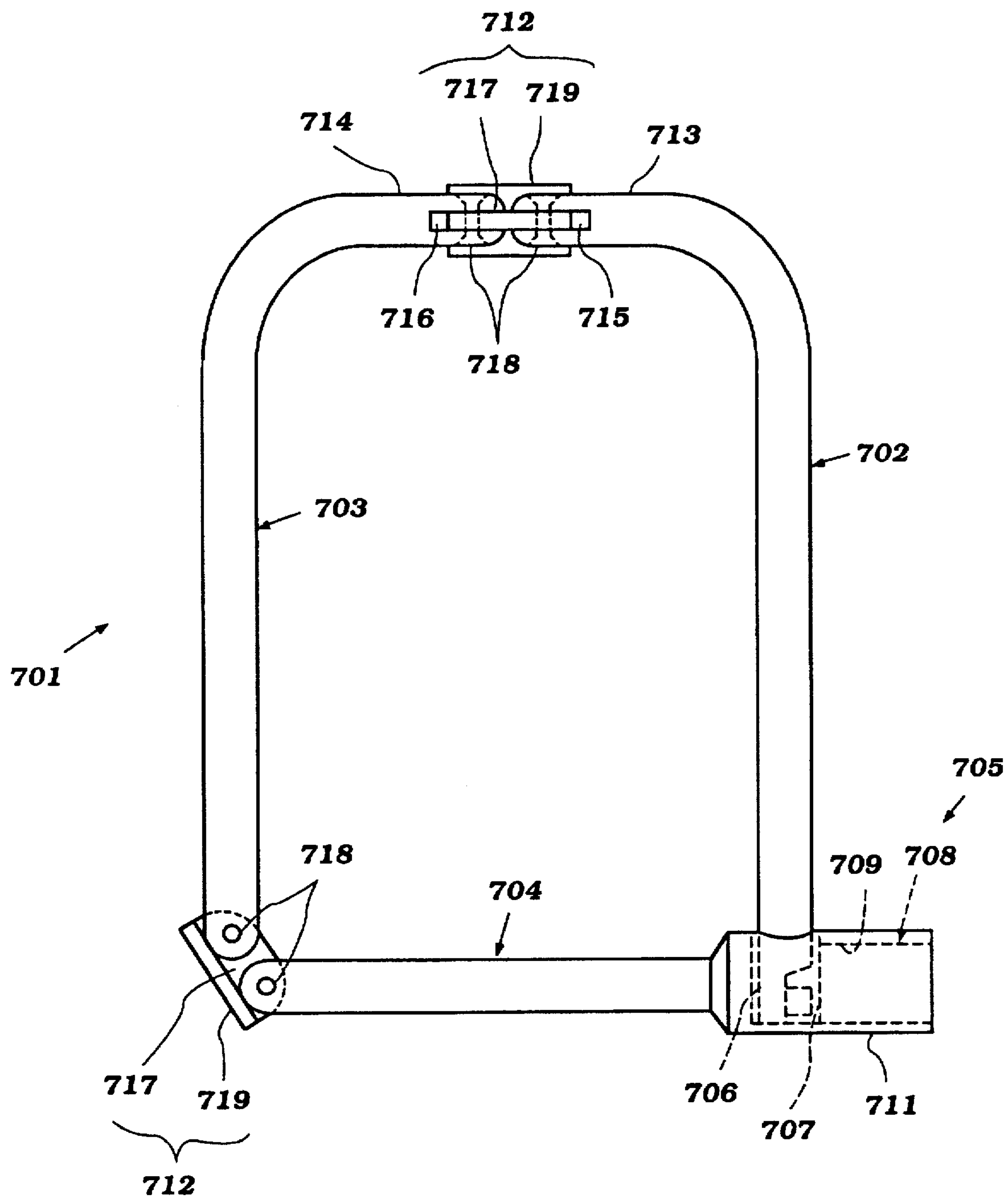
FIG. 28 is a top plan view, in part similar to FIGS. 2 and 24, and shows a further embodiment of the invention in its locked position.
Figure 29:
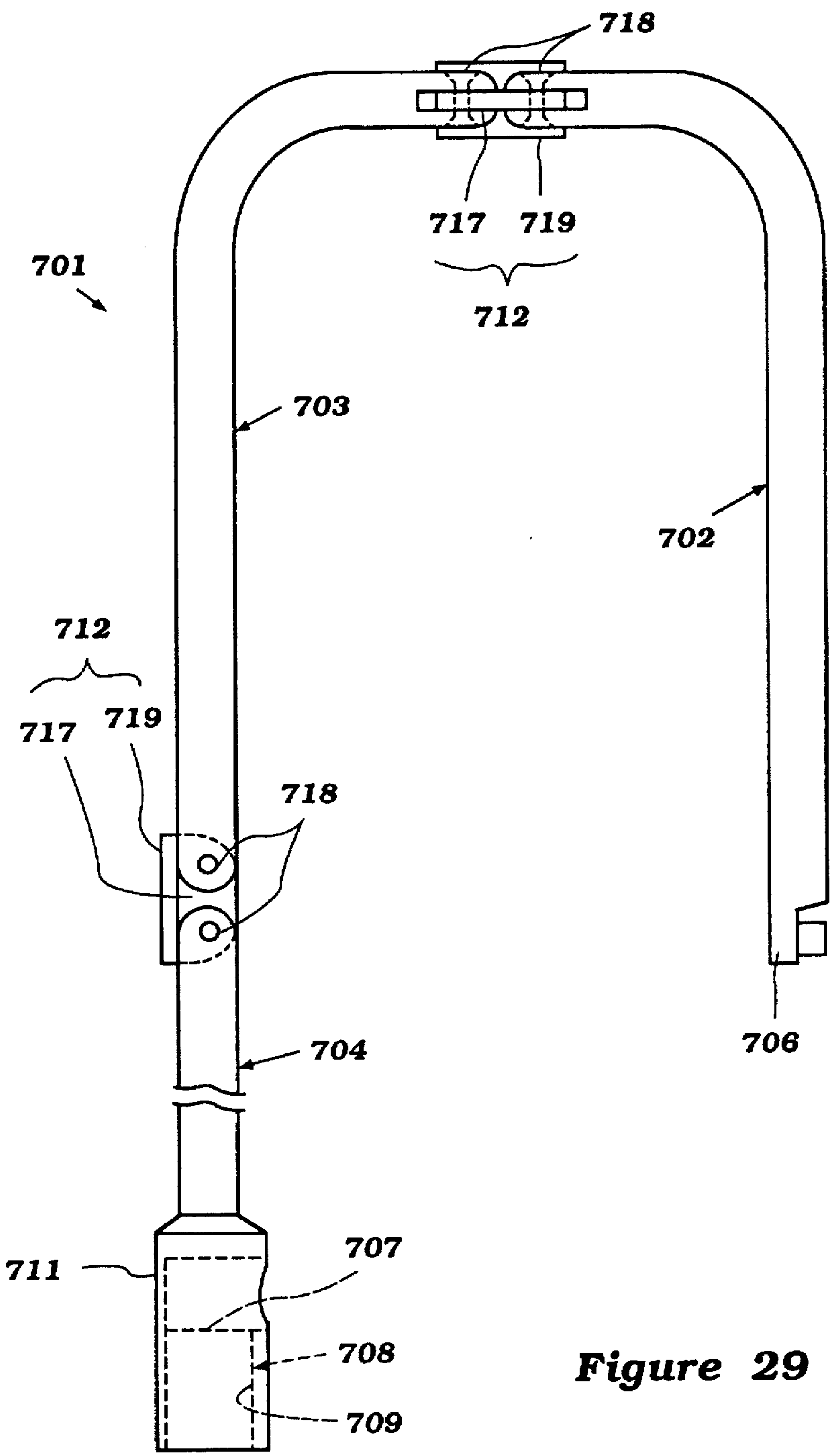
FIG. 29 is a top plan view, in part similar to FIG. 28 and shows this embodiment in an unlocked position and prior to assembly.
Figure 30:
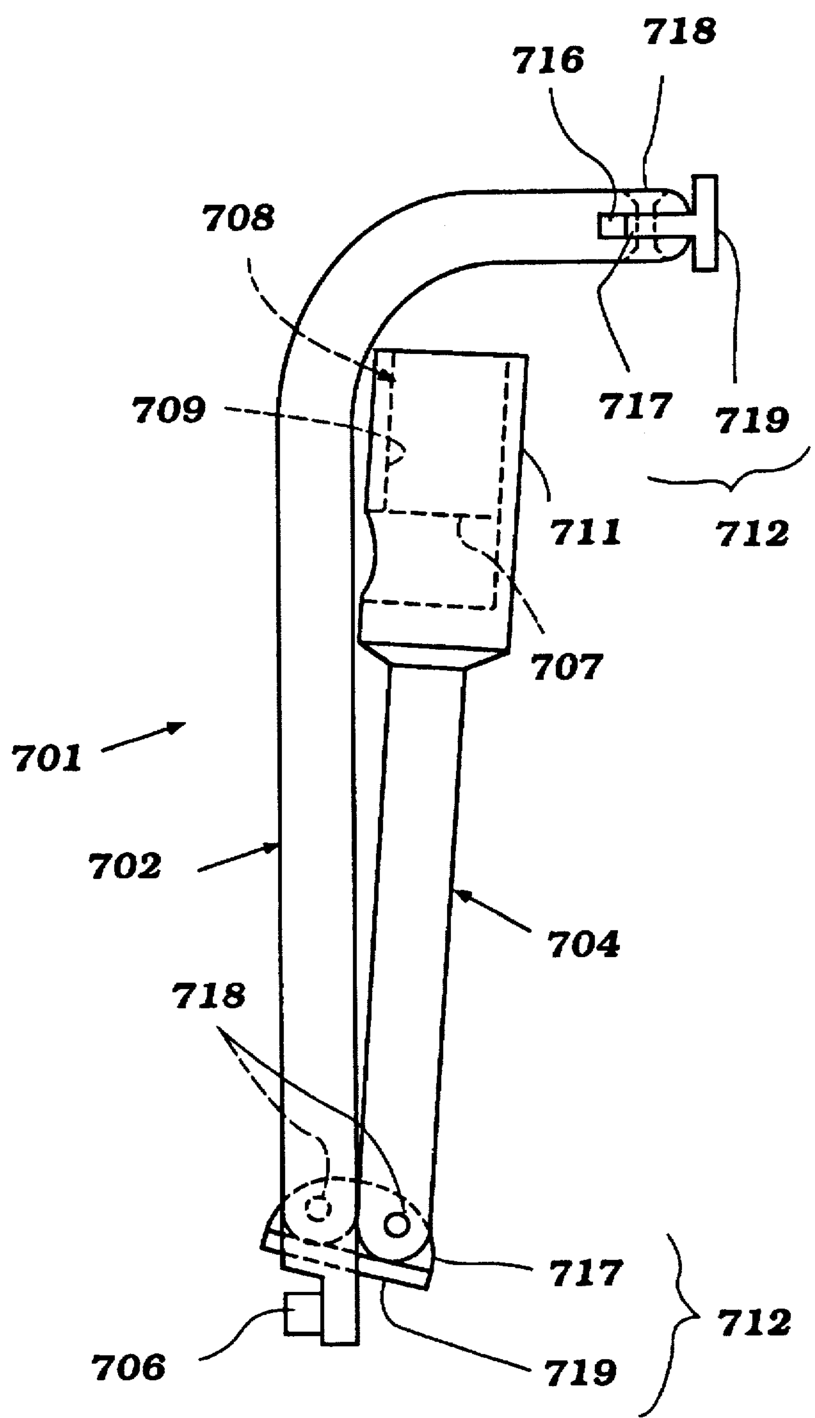
FIG. 30 is a top plan view, in part similar to FIGS. 28 and 29 and shows the lock of this embodiment folded into its storage position.

A locking mechanism constructed in accordance with another embodiment of the invention is shown in FIGS. 28–30 and is identified generally by the reference numeral 701. The locking mechanisms thus far described all use elongated members which have generally the same shape. As a result, these members can be stored by folding with the elongated members lying in side-by-side relationship. However, their construction requires a fairly substantial number of elongated members. The previously described embodiments, however, have the advantage that, except for one end of the locking ends of the links, all of the elongated members can have substantially the same construction.

In the embodiment of FIGS. 28–30, the locking mechanism 701, is constructed so that the elongated members are of different configuration but, in this embodiment, only three elongated members are employed. As will become apparent, the elongated members of this embodiment are pivotally connected to each other by means of a link type mechanism as shown in the embodiments of FIGS. 9–11 and 24–26 and 27. These link type members include a stop mechanism for limiting the degree of pivotal movement in one direction and can also be constructed so as to provide an anti-attack or anti-theft construction as shown in the embodiment of FIGS. 9–11, as will be readily apparent to those skilled in the art.

In this embodiment, the lock mechanism 701 includes a pair of elongated L-shaped members, indicated generally by the reference numerals 702 and 703 with the L-shape member 702 forming the end or locking member. A third generally straight elongated member 704 carries a locking mechanism, indicated generally by the reference numeral 705 at one of its ends and which cooperates with a locking projection 706 formed on one end of the L-shaped elongated member 702 so as to lock the assembly in position as shown in FIG. 28 in which position it will pass through the wheel of a vehicle (not shown) and a stationary member such as the front fork and/or a post or the like.

This lock assembly 705, like those previously described, includes a keeper 707 that is affixed to a tumbler 708 that is contained within a cylindrical recess 709 of a cylindrical member 711. A key (not shown) completes this lock assembly and since it is the same as those previously described, except for minor details, further description of it is not believed to be necessary.

Pivotal connections, indicated generally by the reference numerals 712 are provided for pivotally connected the short legs of the L-shaped elongated member 702 and 703 and the long leg of the elongated member 703 and the straight elongated member 704. These pivotal connections 712 are the same as the type of pivotal connection shown in the embodiments of FIGS. 24–26 and 27 and differ only from each other in the amount and direction in which they limit the pivotal movement between the pivotally connected links.

The pivotal connection between the short legs of the L-shaped members 702 and 703 will be described in detail and it is believed that from this and the previous description of the other similar embodiments, that those skilled in the art will readily understand how the pivotal connections are accomplished and how they limit the degree of pivotal movement.

The adjacent ends 713 and 714 of the short legs of the L-shaped elongated member 702 and 703 have respective slots 715 and 716 that are cross drilled and which receive a drilled pivot link 717. Pivot pins 718 complete the pivotal connection between the link leg 717 and the end portion 714. The link leg 717 has a further leg 719 which cooperates with the L-shaped links 702 and 703 so as to permit them to be folded outwardly to pass through the wheel of a vehicle as shown in FIGS. 28 and 29 but to be folded together in abutting relationship for storage purposes as shown in FIG. 30.

The remaining pivotal connection 712 between the long leg of the elongated member 703 and the straight member 714 permits the link 704 to be pivoted to a straight position as shown in FIG. 29 for installation, to a locked position as shown in FIG. 28 and to a storage position against the long legs of the elongated member 702 and 703 when they are folded together as shown in FIG. 30.

Figure 31:
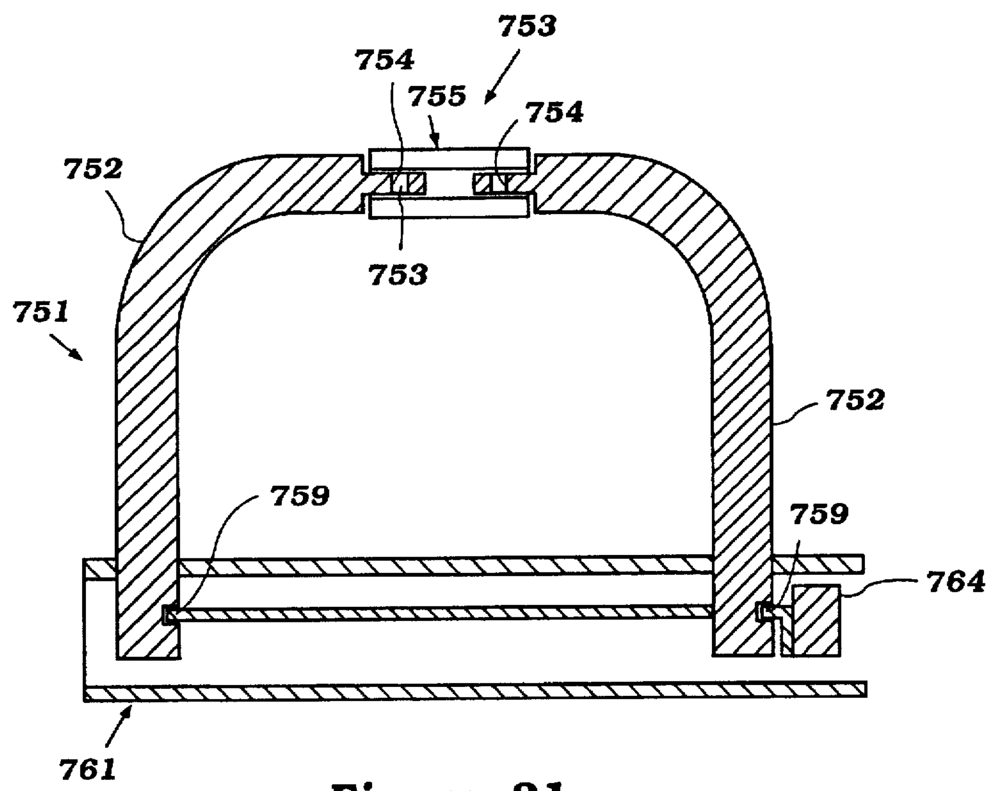
FIG. 31 is a top plan view, with a portion broken away, showing another embodiment of the invention.
Figure 32:
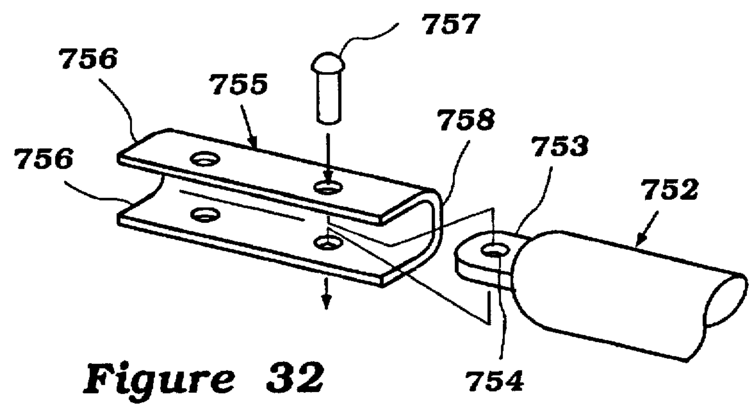
FIG. 32 is an exploded view of one of the pivotal connections of this embodiment.
Figure 33:
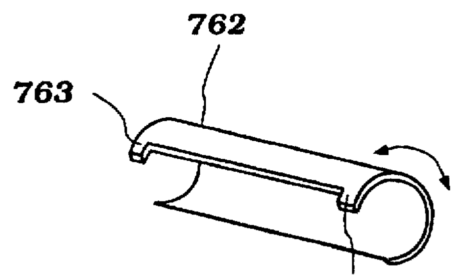
FIG. 33 is a perspective view showing the lock element of this embodiment.

The final illustrated embodiment of the invention is depicted in FIGS. 31–33 and has a construction generally of the type of the embodiments of FIGS. 28–30 but offers a still further simplification. Again, this embodiment illustrates a mechanism which restricts the pivotal movement between two interconnected elongated members in one direction but which may also include the frictional mechanisms and anti-theft mechanisms of the embodiments thus far described.

In this embodiment, the locking mechanism is indicated generally by the reference numeral 751 and includes a pair of L-shaped members 752 that are pivotally connected by a link type mechanism, indicated generally by the reference numeral 73 and which, as has been noted, incorporates an arrangement for limiting the degree of pivotal movement in one direction. In this embodiment, the links 752 that are pivotally connected have flattened end portions 753 that are formed with drilled opening 754. A generally C-shaped link, indicated generally by the reference numeral 755 as a pair of side portions 756 that are drilled in alignment link end opening 754 and received pivot pins 757 for providing a pivotal connection between the link 755 and each of the elongated members 752. The interconnecting leg 758 of the link 755 permits the links 752 to be pivoted towards each other into abutting relationship for storage but precludes rotation in a reverse direction, as should be readily apparent.

The long legs of the elongated member 752 remote from the short legs are provided with keeper like slots 759 and these long leg slotted end portions are adapted to be received in a locking tube, indicated generally by the reference numeral 761 that has in it a rotatably journaled keeper member 762. The locking tube 761 has a pair of locking projections 763 that are adapted to be brought in to locking relationship with the slots 759 so as to lock the assembly around a fixed number and with the elongated member 752 passing through the openings in the vehicle wheel for locking purposes. The locking member 762 is operated by a tumbler mechanism 764 contained within an end of the tube 761 and operated by a key.

It should be readily apparent that the described embodiments of the invention are extremely effective in providing for good locking of a vehicle wheel and provide lock assemblies which can be conveniently folded for storage. In addition, the lock assemblies have pivotal connections which can have any or all of the features of anti-theft, anti-tampering, rotation restriction and also limitation in the degree of rotation so that the mechanisms can be only folded to the storage and locked position and not folded to a position when the locking mechanism cannot be successfully employed. Of course, the foregoing description is that of preferred embodiments of the invention and various changes in modifications may be made, such as the combination of these features as aforenoted, without departing from the spirit and scope of the invention, as defined by the appended claims.

We claim:

1. A wheel lock for a wheel having at least one opening through which said lock is passed, said lock comprising at least a pair of rigid elongated members pivotally connected by a pivot pin, said pivotal connection comprising a pair of adjacent end portions across which said pivot pin extends to define a pivotal axis between said end portions, said end portions being in encircling relation to the ends of said pivot pin so that said pivot pin ends cannot be attacked by a tool acting normally to said pivot axis, said pivot having an intermediate portion extending between said ends portions and means for occluding the complete area around said pivot pin intermediate portion between said end portions so that said pivot pin portion is protected from attack by a tool acting normally to said pivot axis.

2. A wheel lock as in claim 1, wherein the end portions have facing surfaces defining a gap therebetween and the means for occluding closes the gap so that a straight tool cannot be passed therebetween.

3. A wheel lock as in claim 2, wherein the facing surfaces are configured so that the gap is not straight.

4. A wheel lock as in claim 3, wherein one of the facing surfaces is convex and the other of the facing surfaces is concave.

5. A wheel lock as in claim 4, wherein the facing surfaces comprise a pair of angularly related outer portions merging into a generally straight pair of sections adjacent the pivot pin.

6. A wheel lock as in claim 1, wherein the lock comprises a chain made up of a plurality of rigid elongated members consisting of pairs of elongated members having adjacent end portions pivotally connected as set forth in claim 1 the elongated members at opposite ends of said chain having cooperating locking means at respective ends thereof which have no pivotal connection to another elongated member, said cooperating locking means being adapted to be brought into locking engagement with each other for closing the chain when passed through the opening of the wheel for locking the wheel.

7. A wheel lock as in claim 6, wherein each pivot pin comprises a threaded end adapted to be received in a female threaded blind bore formed in one end portion of one of the elongated members, a shank portion adapted to be rotatably journaled in a cylindrical opening in the one end portion of the other elongated member, and a specially formed head portion recessed within said one end portion of said other elongated member.

8. A wheel lock as in claim 7, wherein the end portions have facing surfaces defining a gap therebetween and the means for occluding closes the gap so that a straight tool cannot be passed therebetween.

9. A wheel lock as in claim 8, wherein the facing surfaces are configured so that the gap is not straight.

10. A wheel lock as in claim 9, wherein one of the facing surfaces is convex and the other of the facing surfaces is concave.

11. A wheel lock as in claim 9, wherein the facing surfaces comprise a pair of angularly related outer portions merging into a generally straight pair of sections adjacent the pivot pin.

* * * * *